US008272053B2

(12) United States Patent
Markham et al.

(10) Patent No.: US 8,272,053 B2
(45) Date of Patent: Sep. 18, 2012

(54) PHYSICAL SECURITY MANAGEMENT SYSTEM

(75) Inventors: Thomas R. Markham, Anoka, MN (US); Walter Heimerdinger, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1325 days.

(21) Appl. No.: 11/249,622

(22) Filed: Oct. 13, 2005

(65) Prior Publication Data

US 2006/0059557 A1 Mar. 16, 2006

Related U.S. Application Data

(63) Continuation-in-part of application No. 11/017,382, filed on Dec. 20, 2004.

(60) Provisional application No. 60/709,315, filed on Aug. 17, 2005, provisional application No. 60/530,803, filed on Dec. 18, 2003.

(51) Int. Cl.
*G06F 21/00* (2006.01)

(52) U.S. Cl. .......................................... 726/23; 726/25

(58) Field of Classification Search ................ 726/2, 22, 726/23, 25
See application file for complete search history.

(56) References Cited

U.S. PATENT DOCUMENTS

| | | | | |
|---|---|---|---|---|
| 3,866,173 | A | 2/1975 | Moorman et al. | |
| 4,148,012 | A | 4/1979 | Baump et al. | |
| 4,538,056 | A | 8/1985 | Young et al. | |
| 5,465,082 | A | 11/1995 | Chaco | |
| 5,541,585 | A | 7/1996 | Duhame et al. | |
| 5,568,471 | A * | 10/1996 | Hershey et al. | 370/245 |
| 5,959,574 | A * | 9/1999 | Poore, Jr. | 342/96 |
| 6,072,402 | A | 6/2000 | Kniffin et al. | |
| 6,249,755 | B1 | 6/2001 | Yemini et al. | |
| 6,334,121 | B1 | 12/2001 | Primeaux et al. | |
| 6,347,374 | B1 | 2/2002 | Drake et al. | |
| 6,490,530 | B1 * | 12/2002 | Wyatt | 702/24 |
| 6,499,025 | B1 * | 12/2002 | Horvitz et al. | 706/52 |
| 6,801,907 | B1 | 10/2004 | Zagami | |
| 6,910,135 | B1 | 6/2005 | Grainger | |
| 7,421,738 | B2 * | 9/2008 | Harp et al. | 726/25 |
| 2002/0059078 | A1 * | 5/2002 | Valdes et al. | 705/1 |

(Continued)

FOREIGN PATENT DOCUMENTS

EP 0629940 12/1994

(Continued)

OTHER PUBLICATIONS

Gregor et al. "EMS-Vision: A Perceptual System for Autonomous Vehicles", IEEE Transactions on Intelligent Transportation System, vol. 3, No. 1, Mar. 2002, pp. 48-59.*

(Continued)

*Primary Examiner* — Hadi Armouche

(74) *Attorney, Agent, or Firm* — Seager Tufte & Wickhem LLC

(57) ABSTRACT

A physical security system having a plurality of sensors and a sensor report aggregator. The sensors may detect a large number of physical activities. The aggregator may cluster a large number of detected reports to a small number of sets of reports. The sets of reports may be reduced to hypotheses. From the hypotheses, the aggregator may develop hypotheses about the physical environment which the sensors are monitoring in view of a security reference model. The security reference model may include, but not be limited to, facility models, physical security models, and/or attack models. The hypotheses may have probabilities assigned to them according to their certitude of likelihood and severity of danger.

18 Claims, 23 Drawing Sheets

U.S. PATENT DOCUMENTS

| | | | | |
|---|---|---|---|---|
| 2002/0098794 | A1* | 7/2002 | Krafthefer | 454/370 |
| 2002/0118096 | A1 | 8/2002 | Hoyos et al. | |
| 2003/0028531 | A1 | 2/2003 | Han et al. | |
| 2003/0040815 | A1* | 2/2003 | Pavlidis | 700/48 |
| 2003/0093514 | A1* | 5/2003 | Valdes et al. | 709/224 |
| 2003/0117279 | A1 | 6/2003 | Ueno et al. | |
| 2003/0174049 | A1 | 9/2003 | Beigel et al. | |
| 2003/0208689 | A1 | 11/2003 | Garza | |
| 2004/0017929 | A1* | 1/2004 | Bramblet et al. | 382/103 |
| 2004/0019603 | A1* | 1/2004 | Haigh et al. | 707/102 |
| 2004/0062421 | A1 | 4/2004 | Jakubowski et al. | |
| 2004/0064260 | A1* | 4/2004 | Padmanabhan et al. | 702/19 |
| 2004/0064453 | A1 | 4/2004 | Ruiz et al. | |
| 2004/0087362 | A1 | 5/2004 | Beavers | |
| 2005/0278062 | A1 | 12/2005 | Janert et al. | |
| 2006/0059557 | A1 | 3/2006 | Markham et al. | |

FOREIGN PATENT DOCUMENTS

| | | |
|---|---|---|
| WO | 9419912 | 9/1994 |
| WO | 0160024 | 8/2001 |

OTHER PUBLICATIONS

Fong et al. "Vehicle Teleoperating Interfaces", Autonomous Robots 11, 2001, published by Kluwer Academic Publishers, pp. 9-18.*

Rintanen et al. "Development of an Autonomous Navigation System for an Outdoor Vehicle", Control Engineering, vol. 4, No. 4, 1996, PII: S0967-0661(96)00032-9, Elsevier Science Ltd, printed in Great Britain, pp. 499-505.*

Pellkofer et al. "EMS-Vision: Gaze Control in Autonomous Vehicles", Proceedings of the IEEE Intelligent Vehicles Symposium 2000, Dearborn (MI), USA, Oct. 3-5, 2000, pp. 296-301.*

Goldman et al., "Information Modeling for Intrusion Report Aggregation," 2 pages, printed Aug. 15, 2005.

* cited by examiner

PHYSICAL SECURITY MANAGEMENT SYSTEM

This present application claims priority under 35 U.S.C. §119(e) (1) to U.S. Provisional Patent Application No. 60/709,315, filed Aug. 17, 2005, and entitled "Physical Security System", wherein such document is incorporated herein by reference. This present application also claims priority as a continuation-in-part of U.S. Nonprovisional patent application Ser. No. 11/017,382, filed Dec. 20, 2004, and entitled "Intrusion Detection Report Correlator and Analyzer", which in turn claims priority under 35 U.S.C. §119(e) (1) to U.S. Provisional Patent Application No. 60/530,803, filed Dec. 18, 2003, and entitled "Intrusion Detection Report Correlator and Analyzer", wherein such documents are incorporated herein by reference.

BACKGROUND

The present invention pertains to security systems and particularly to security systems for physical installations. More particularly, the invention pertains to assessing the security of physical installation on the basis of sensor information.

SUMMARY

The invention may be a system that assesses the security of an installation by dynamically aggregating and assessing sensor information.

DESCRIPTION

There is an increasing need to protect physical assets such as airports, refineries, manufacturing plants, transportation networks, and the like, from physical threats. Many sensors (e.g., radar, infrared detectors, video cameras, vibration detectors, and so forth) are being developed and deployed. The outputs of these sensors may be numerous and disjointed. Consequently, security personnel receive many "sensor reports" which may not be significant and/or not correlated.

Figure 1:
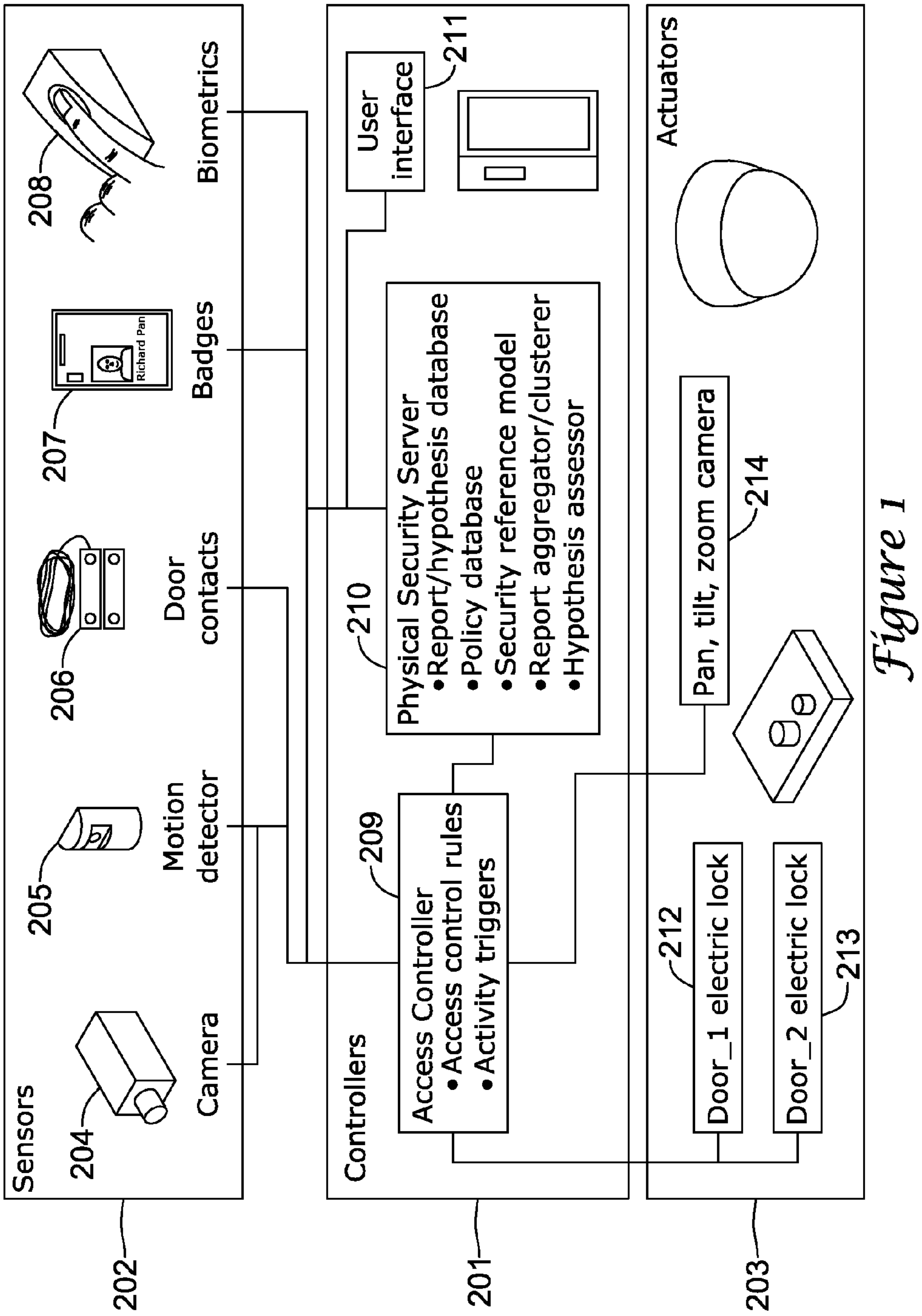
FIG. 1 is an illustrative example of a physical security system.

The invention may be a system for assessing the security of physical installation on the basis of sensor information, informing a security analyst or guard of the security status of the installation, and responding to high probability security activities with appropriate actions. The present system may address a significantly growing number of sensor reports and a massively increasing amount of information, and consequently an immensely large workload of security personnel, by applying Bayesian logic or other techniques to provide a higher level hypothesis of what is happening. This system may reduce the number of false alarms that security personnel need to deal with and provide greater awareness of the security situation A sample physical security and access control system is shown in FIG. 1. The system may have a controller section 201, a sensor section 202 and an actuator section 203. The sensor section 202 may include cameras 204, motion detectors 205, door contacts 206, badges 207, biometrics 208, and other types of sensors. The controller section 201 may have an access controller 209 and a physical security server 210 connected to the sensors of section 202. The access controller 209 may contain access control rules, activity triggers, and the like. The physical security 210 server may include a report database, a hypothesis database, a policy database, a security reference model, a report aggregator/cluster, a hypothesis assessor, and the like. A user interface 211 may be connected to the controller 209 and the server 210. The access controller 209 may be connected to actuators of section 203. Specifically, the controller 209 may be connected to actuators such as, for example, door electric locks 212 and 213, and camera pan, tilt and zoom actuators 214.

Figure 2:
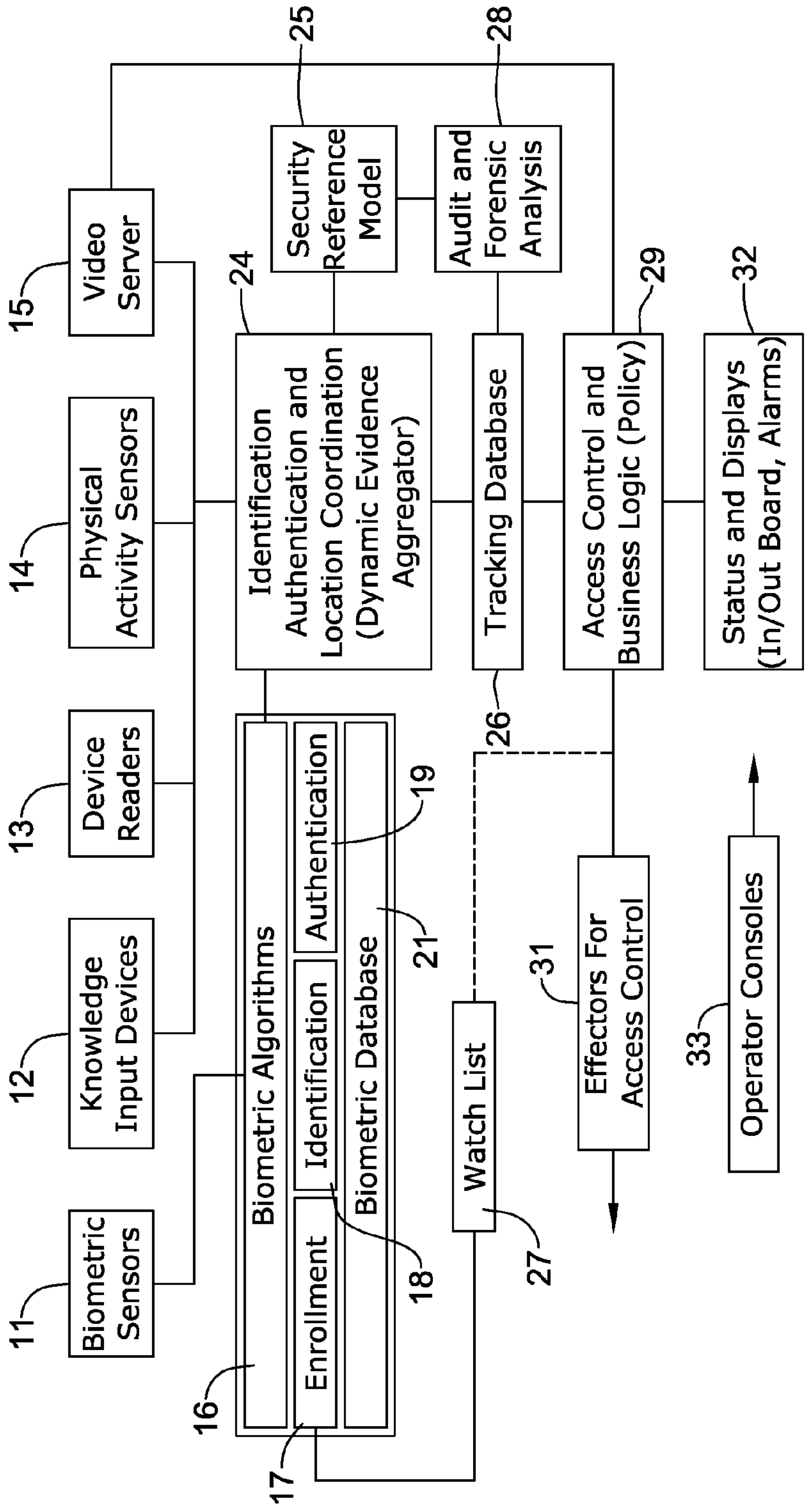
FIG. 2 shows an example of architecture for access control and surveillance.

An example of architecture for access control and surveillance is shown in FIG. 2. There may be biometric sensors 11, knowledge input devices 12, device readers 13, physical sensors 14 and a video server 15. The biometric sensors may be connected to biometric algorithms 16 which may tie into an enrollment 17, identification 18 and authentication 19, in turn which interact with a biometric database 21. The enrollment 17 may be connected to a watch list 27 such that individuals on the watch list are enrolled in the system. The knowledge input devices 12, device readers 13, physical sensors 14 and video server 15 may have inputs to the identification, authentication and location module 24 which incorporates the dynamic evidence aggregator. Module 24 may interact with the biometric algorithms 16, a security reference model module 25 and a tracking database 26. An audit and forensic analysis module 28 may be connected to the security reference model module 25 and the tracking database 26. An access control and business logic (policy) module 29 may be connected to the tracking database 26. Module 29 may also be connected to effectors for access control module 31, the video server 15 when tasked as an effector and a status and displays (in/out board, alarms, and so on) module 32. The watch list 27 may interact with the module 29 and module 31. Operator consoles 33 may interact with any module in the system.

A number of sensors may provide reports on physical activity in a monitored environment. These sensors might include biometric identification devices, keypads, badge readers, passive monitors such as motion detectors and video/audio surveillance.

Sensor reports may be processed and stored in a tracking database. Information stored may include when a report occurred, the type of report, and the sensor that generated it. Simple sensors, such as a door contact, might report only limited information, e.g., the door is open or closed. More sophisticated sensors may include biometrics, which could report that an individual is on a watch list (with a certain probability), and a video, which might report that there is a possibility of fighting going on in one of the monitored areas.

Figure 3:
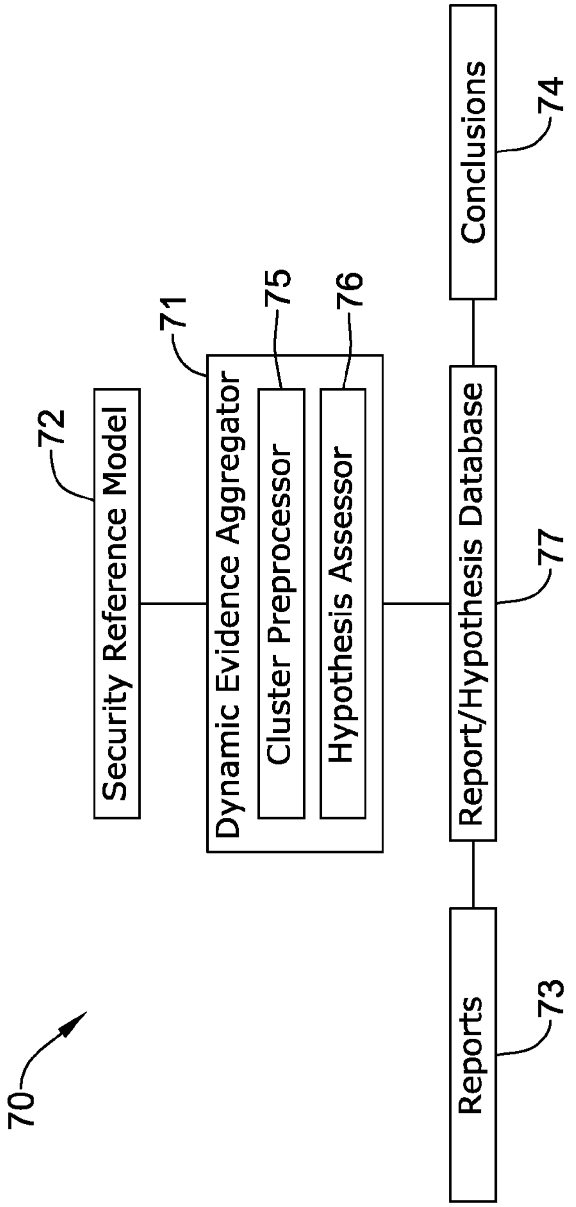
FIG. 3 is a diagram of a system implemented process that correlates and analyzes sensor reports according to an illustrative example.

FIG. 3 is a diagram of the operation of a security alert management system indicated generally at 70. System 70 uses a dynamic evidence aggregator (DEA) 71 to combine results from multiple sensors to reduce the false alarm rate and decrease the time required to detect an intrusion. In one illustrative example, a facility may be monitored for intrusions. The facility may include multiple devices, such as door contacts, motion detectors, cameras, biometrics, badge readers and infra-red beam devices coupled to a sensor network.

In one illustrative example, the system 70 may include a Bayesian estimation network and a calculus based on qualitative probability. The DEA 71 may rely upon a knowledge base called the security reference model (SRM) 72, containing information about the protected facility, its configuration, installed sensors, and related security goals. In one illustrative example, the SRM 72 may be an object model using a hierarchy of objects to represent the model.

DEA 71 may receive sensor reports 73 such as motion detection, pressure or door openings at various points in a monitored system. System 70 may retain all received sensor reports, often tens of thousands of reports per day from a moderately complex facility. While the number of reports may be reduced by "tuning," individual sensors, a point may be reached where information about hostile activity is lost. System 40 (shown in FIG. 4) in one illustrative example uses a two-step process to help a security analyst locate serious security activities among the thousands of sensors reports.

Three example reports are shown. Report 48 may be an alert from a motion detector. A video detection report 49 may be an image from a camera. Logical sensor report 51 may be an audit report of an unauthorized user attempting to log in at a computer located in the same room as the motion detector. First, each of the incoming reports may be clustered with one or more explanations or hypotheses, as indicated for example at potential hypothesis 47. Hypothesis H1 at 47 may represent one explanation for sensor reports: a sticky door, and hypothesis H2 at 47 may be used to represent an alternative explanation for sensor reports: an intrusion in progress.

The second step of the process may use information in the security reference model 41 to score hypotheses in terms of plausibility (likelihood of occurrence) and impact (severity). These scores may be examined in a graphical user interface (GUI) to determine the likely security posture of the facility. Likely security situations may then be provided as indicated at outputs 52 and 53 of hypotheses and alarms, and uninteresting hypotheses, respectively.

The sensors and detectors that provide the reports 46 may be any type generally available. Some typical detection strategies include looking for anomalies. These may not be security violations in themselves but would suggest abnormal activity. Other detection strategies may be characterized as policy driven detectors, which look for known policy violations. They generally look for known artifacts, such as a door opening without first reading and then granting access to a badge. The reports may be generated by physical sensors (e.g., door contacts) or from computer or device logs (e.g., logon attempts).

The security reference model 41 may contain a facility model 43 that models computers, devices, doors, authorized zones, sensors and other assets, the criticality of assets, what sensors are used for, and security vulnerabilities—all stored in a knowledge base. A security model 44 may contain a security goal database including a hierarchy of security policies. The attack model 45 may include various attack models that are kept in a knowledge base in a probabilistic form. They may represent different kinds of attacks, and the probabilities of attacks given certain attack characteristics, such as tailgating.

As indicated above, the security reference model 41 comprises a number of top-level schemes. Multiple lower level objects may inherit characteristics from one or more of these schemes. Examples of the schemes include but are not limited to local-thing, operation, organization, role, person, biometric data, door, privilege, process, mode (normal or emergency), date/time, test-data, vendor specific sensor data, and vulnerabilities.

Figure 4:
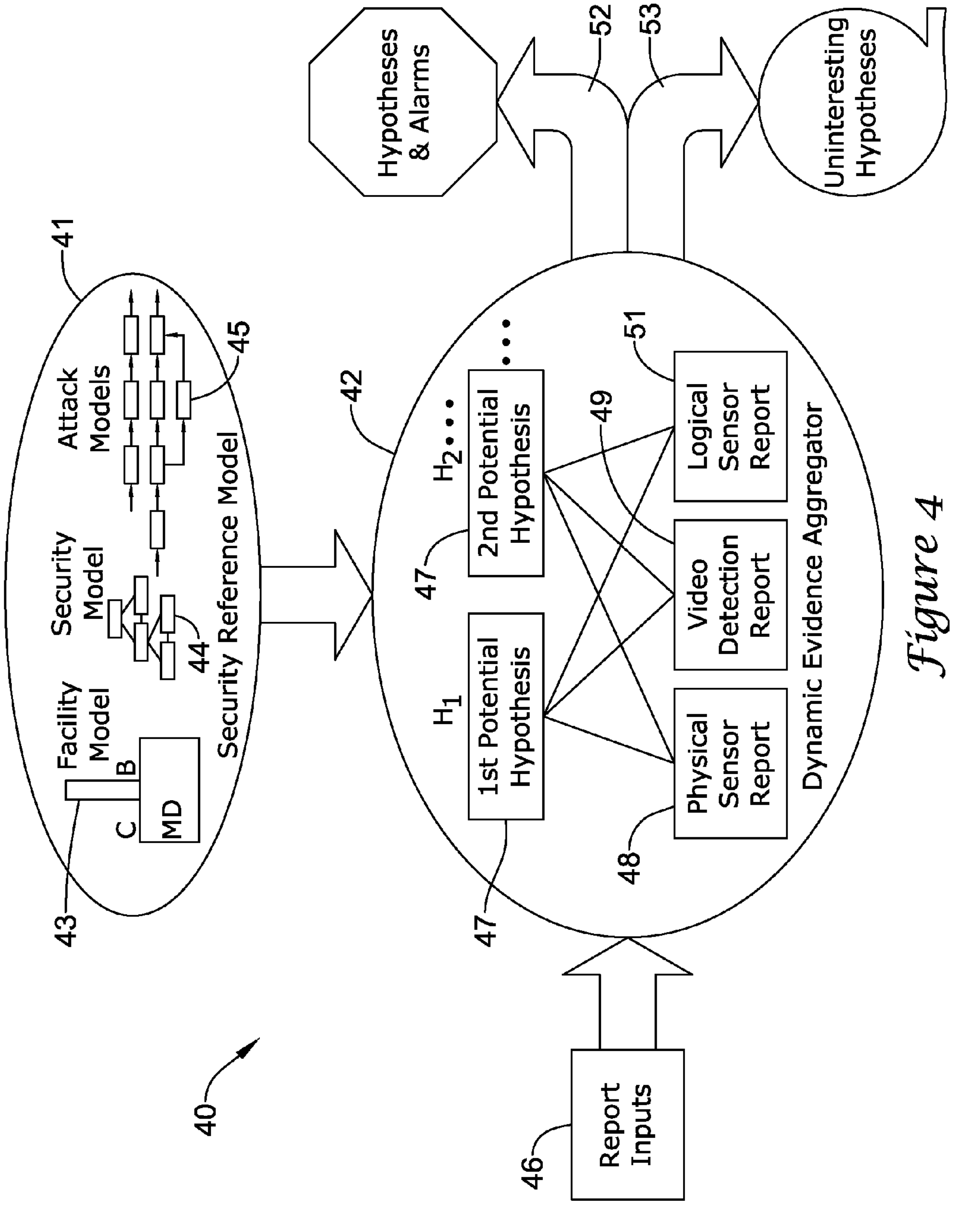
FIG. 4 is a block diagram of an architecture for the system of FIG. 3 according to an illustrative example.

FIG. 4 depicts the system 40 architecture. A variety of third-party sensors may be placed throughout the protected facility. A set of tailored converters may translate reports into a form appropriate for a dynamic evidence aggregator 42—a standard XML reporting format is supported but other formats are possible. In further illustrative examples, the converters may be local to the system 40, and translate reports as they are received from the sensors or conversion may take place within or near the sensor.

The reports may then be clustered with associated hypotheses 47. Hypotheses may be pre-existing or may be established as needed. The resulting hypotheses may be sent to an analyzer, which uses Bayesian qualitative probability to assign scores for hypothesis plausibility (i.e., the likelihood that the hypothesis has occurred) and severity. Both sensor reports and related hypotheses may be stored in a database for later correlation and analysis and/or may provide a real-time flow of hypotheses.

Once the reports are clustered and associated with hypotheses, the hypothesis analyzer may weigh evidence for hypotheses that have been hypothesized. Some clusters may represent alternative hypotheses. Different scenarios, such as false alarms, innocuous hypotheses, intrusions, and so forth, may be weighed against each other using qualitative probability. The hypothesis analyzer may also compute the effect of intrusion hypotheses on security goals. A hierarchy of goals may allow for inference up a goal tree. Further, higher levels of security goal compromise based on the compromise of lower goals may be inferred.

The system 40 may be used as a stand-alone correlation and analysis system or may be embedded as part of a hierarchy of intrusion sensors and correlators. In stand-alone mode, system 40 reports and hypotheses may be viewed on a graphical console via 52. A guard or security analyst at the console may view hypotheses as they are processed by the analyzer in real time or can retrieve hypotheses from the database using queries. In the embedded mode, correlation hypotheses may be transmitted to other correlation or analysis entities associated with the facility.

Prior analysis of reports stored in database may be clustered reports by common source, location, subject photo, badge ID, times, and canonical attack name. The present system may additionally correlate data as a function of whether it is related to another hypothesis, such as a manifestation or side effect of another hypothesis, part of a composite hypothesis, or even a specialization of one or more hypotheses. These may be sometimes referred to as hypothesis to hypothesis linkages. Reports may be linked to hypotheses. A single report may support more than one hypothesis or a single hypothesis may be supported by multiple reports. When no existing hypothesis is close enough to be a plausible cause, a new hypothesis may be developed.

A graphical user interface (GUI) may help a guard or security analyst rapidly review all information from a selected period and to rapidly select the most important hypotheses. Two powerful facilities may be provided: a "triage" table and a set of filters. These may be used to control which hypotheses are displayed to the user.

A query filter selection may allow selection of the time interval to be considered. This may also allow the analyst to select sensor reports, hypotheses, or selected subsets of hypotheses and provides access to filters that select hypotheses to be displayed A list pane on the display may provide a scrollable list of individual hypothesis or report descriptors of all of the selected hypotheses or sensor reports. The analyst may group hypotheses in this list by start time (the default), by the person involved, by hypothesized intent, by location, or by sensor source. Reports may be grouped by report time, report signature, reporting sensor, or location.

Clicking on an individual hypothesis descriptor may provide details of the selected hypothesis. Details available include the reported start time and end time of the hypothesis, the duration of the hypothesis, the adjudged levels of plausibility, severity and impact, and an estimate of the completeness of the attack in reaching its likely objective.

Auxiliary links may be provided to allow an analyst or guard with control of cameras to view relevant areas. Another link may open a note window to permit an analyst or guard to append notes to the hypothesis record. An analyst may use the notes window to propose different scores for plausibility and severity based upon additional factors (e.g., maintenance within the facility) unknown to the system.

The locations and methods of interacting with these various visual constructs, such as panes, windows and links may be varied in different illustrative examples based on ergonomic factors or other factors as desired.

In one illustrative example, the system may use information in the tracking database 26. In further illustrative examples, the system may be used to analyze data in near real time as it flows into the system from sensors.

The security alert management system may process reports from a variety of sensors. Thousands of reports per hour may be processed, and associated with a smaller set of information (hypotheses) that is more relevant, and focuses an analyst or guard on the most probable cause of the reports, including security attacks. By clustering and correlating reports from the multiple sensors, stealthy attacks may be more effectively detected, and a vast reduction in false alarms and noise be obtained. The categorization of hypotheses by plausibility, severity and utility may lead to a more efficient review of the hypotheses. Hypotheses and intrusion reports may be retained in databases 52 and 53 for forensic analysis.

The present system may be built by integrating a dynamic evidence aggregator 42 with a reference model 43 of the facility being assessed relative to its physical security. The reference model may include a description of the facility, and models of various forms of behavior (e.g., threatening actions, normal actions, accidents, and so forth).

The system may enable more acquisition tools, more surveillance points, more intelligent correlation tools and faster and more scalable processing. More acquisition tools may aid in the exposing social networks by capturing multiple persons (wherein at least one of them is known) in a scene and providing coordination between facilities. More surveillance points may support geographically dispersed surveillance to make it more difficult for dangerous persons to move about. More intelligent correlation tools may deal with large amounts of sensor data by reducing the amounts to a size that a person can reasonably observe. Situation awareness may be improved via a fusion of information from various sensors. The faster and more scalable processing may provide a person an ability to observe more, do better inquiries and respond to potentially and/or actual dangerous situations more quickly and effectively.

The system may apply Bayesian logic to sensor inputs from physical devices and related hypotheses. Many reports and inputs may be received by the system. There may be a shift from human analysis to computing and networking. The system may correlate information from multiple and disparate intrusion sensors to provide a more accurate and complete assessment of security. It may detect intrusions that a single detector cannot detect. It may consolidate and retain all relevant information and sensor reports, and distill thousands of reports to a small number (e.g., a dozen or so) of related hypotheses. The system may weigh evidence from the reports for or against intrusions or threats. It may discount attacks against non-susceptible targets. The system may identify critical hypothesis using Bayesian estimation technology to evaluate intrusion hypothesis for plausibility and severity. It may generate a hypothesis of an attacker's plans.

The system may involve accelerated algorithms, and fast hardware, logical access, multi-facility tracking, advanced device readers, and an attainment of non-cooperative acquisition. Search times may be sufficiently short to make large scale biometric access control and large surveillance systems practical. Logical access may extend to biometrics. Device readers may include those for identifying cell phones, Bluetooth equipment, badges, license plates, faces, and so forth.

Information from device readers may be correlated with video and biometric information. Multi-facility tracking may permit tracking of individuals across a system boundary, for example, from one airport to another in the case of import/export "suspects". The system may be compatible and interface with various acquisition approaches.

It appears that a single detector might not be effective at detecting and classifying all possible intrusions. Different detection techniques may be better suited to detect and classify different types of intrusions. One type of intrusion may even require different detection techniques for different operational states of a system. To gain reasonable coverage, it may be necessary to have large numbers of intrusion detectors that make use of an equally large number of detection techniques.

Information aggregation is of significance in the present approach. In order to make sense of the results of a large number of different detectors, it should be possible to easily combine the information from differing types of detectors using differing algorithms for their inference into a coherent picture of the state of a system and any possible threats. As time goes by new detectors may be added to the system and the aggregator may make use of the new information provided. Nodes in the system can be lost, removing critical detectors and information from the decision making process. Multiple detectors may be looking at the same activities. An aggregator should not give undue weight to multiple reports based on the same evidence but should recognize that multiple reports of the same activity with differing evidence are more credible.

Many central intrusion assessment consoles do not necessarily use information such as security goals. Many intrusion report consoles may merely gather reports from multiple sensors and correlate them by time window or location. Important context information, such as security goals for individual components, the current physical configuration, the current threat environment, and the characteristics of individual intrusion sensors, does not appear to be used in report analyses.

Current intrusion assessors do not appear to assign levels of certainty to conclusions. Existing central intrusion assessment consoles appear to emit alarms with no assessment of likelihood, leaving an assessment of the plausibility of an alarm to an operator (guard or security analyst).

Current intrusion assessors do not appear to weigh detector reports based on certainty. Individual detectors do not necessarily indicate with certainty that an intrusion has occurred. This appears to be especially true with anomaly detectors. Rather than requiring detectors to provide "all or nothing" conclusions, detectors may be allowed to provide a confidence value relative to detected activities. Confidence values may be used by the aggregator in combining detected but inconsistent information of detectors or sensors to weigh their relative certainty.

The system may provide the following benefits. There may be multiple-detector support. Recognizing that no single detection technique is necessarily effective against a broad spectrum of intrusions, system correlation technology may interpret reports from multiple types of detectors in an independent manner.

There may be an ability to dynamically add new detectors. The system may allow new detectors to contribute meaningfully to the system's picture of the world state. Such an open architecture may allow the system to evolve along with an improved state of the art in intrusion detection.

There may be substantial information flow reduction. The system may propose an intrusion hypothesis that, in many cases, could represent a larger number of intrusion detector reports, thus reducing the volume of information presented to an analyst. However, individual reports are generally not discarded, and may be available through links from intrusion hypotheses. This clustering of reports with related reports may make it easier to reason about the plausibility of the hypothesis. The system may distinguish between reports that reinforce others and reports that are merely redundant.

FIG. 3 illustrates the principal components of such a system. Reports of physical observations 73 may be provided directly, or via a report/hypothesis database 77, to a dynamic evidence aggregator 71 that uses information about the protected physical environment contained in a security reference model 72 to provide conclusions 74 about the state of security of the protected environment. The dynamic evidence aggregator 71 may contain a cluster pre-processor 75 that collects reports into related groups and proposes hypotheses to explain these reports and a hypothesis assessor 76 that estimates the likelihood and impact of the hypotheses.

The dynamic evidence aggregator (DEA) 71 may combine reports 73 from multiple intrusion detectors or sensors to confirm the aggregators' conclusions and to develop wider based conclusions 74 about the likelihood and kinds of possible attacks. It may assess the likelihood that an intrusion has occurred, the type of the intrusion, and the resulting changes in physical security status. This component may be based on qualitative probability theory which allows for maximum flexibility in dynamic domains while still producing globally reasonable conclusions about the possibility of intrusion.

The security reference model (SRM) 72 may provide the context necessary for a high level intrusion report analysis. The SRM 72 may describe the structure of the system being protected, security goals and alert levels in force for the system, operational behavior of the system, and likely attack plans. It may provide a central repository for all of the information necessary for intrusion assessment.

On the basis of the data in the SRM 72 and reports 73 from the intrusion detectors and/or sensors, the DEA 71 may generate hypotheses of activities (some of them attacks, some of them benign situations) that may occur. The DEA may associate with these hypotheses a set of reports that provide relevant evidence. The DEA may evaluate the hypotheses and determine how likely they are, given the evidence. The DEA may also determine how severe a particular hypothesis is, given that the hypothesis may have actually occurred, in the context of a particular environment.

The DEA 71 may do further reasoning to determine violations of security goals immediately resulting from attacks, consequences of these attacks for the environment and the security goals compromised by the attack, the attackers' intended goals, and the attackers' most likely next actions. The DEA may provide its users the ability to influence the evidence aggregation function.

The DEA 71 may have a cluster preprocessor component 75 and a hypothesis assessor 76. The DEA may engage in three kinds of inference. First, the DEA may identify the set of activities (possibly a singleton) that could be the underlying cause of a report. Second, the DEA may identify those sensor reports that could refer to the same underlying report. This may be regarded as clustering. Third, the DEA may evaluate the evidence for and against particular hypotheses, taking into account competing hypotheses, to determine how likely a particular hypothesis is, given a set of evidence (reports and/or information), in the context of the running system. The first two inferences may be performed by the cluster preprocessor component 75, and the third inference may be performed by the hypothesis assessor 76. Next, given a particular hypothesis and a particular enterprise configuration, the DEA may be able to determine the severity of a hypothesis. The latter task may be performed by the cluster preprocessor component.

The system may use Bayesian networks for probabilistic reasoning. They may simplify knowledge acquisition and, by capturing (conditional) independences, simplify computation. In particular, the networks may help to capture several important patterns of probabilistic reasoning. Some of the patterns may include reasoning based on evidence merging, reasoning based on propagation through the subset/superset links in an intrusion model, distinguishing between judgments that are based on independent evidence and those that use the same evidence, and distinguishing between causal (predictive) and evidential (diagnostic) reasoning.

System evidence aggregation may be based on qualitative probabilities. Qualitative probabilities may share the basic structure of normal probability theory but abstract the actual probabilities used. This may simplify knowledge acquisition and make the requirements on detector implementers as easy as possible to meet.

Instead of the probability of a hypothesis being the sum of the probabilities of the primitive outcomes that make up that hypothesis, the degree of surprise of a hypothesis may be the minimum of the degrees of surprise of the primitive outcomes that make it up. Instead of having the probabilities of mutually exclusive and exhaustive hypothesis sum to one, at least one of a set of mutually exclusive and exhaustive hypothesis may be unsurprising. Finally, the system may use an analog of Bayes' law in which the normalizing operation consists of subtraction rather than division.

Effective intrusion detection may require information about the target environment and its state as well as more global information such as the current assumed threat level.

The security reference model 72 may store the attributes of the physical environment being protected. In the same system, a cyber environment may also be monitored and protected. Example attributes include topology of the environment, logical connections in the environment, security policies and rules in effect, principals and their roles, and types of intrusions that have been identified for this environment and possible attack plans. The SRM 72 may be designed to interface with discovery tools for automatic configuration and maintenance. The SRM may also provide essential information for the management of intrusion sensors, such as focused filtering of a sensor signal stream.

Using evidence aggregation may improve situation awareness in a physical security setting. This may be part of a larger access control and surveillance initiative aimed at physical security for airports and similar environments where physical access control is critical.

The system may correlate reports, received from a variety of intrusion detection arrangements, in the physical and cyber realms. The goal may be to adapt the system to correlate sensor reports from the physical environment and then develop and rank hypotheses that most likely explain these reports. This system may provide two major benefits. First, by correlating reports from multiple sensors that are monitoring the same, or closely connected, activities, the system may be able to compensate for deficiencies in individual sensors and reduce false positive alerts. Second, by correlating multiple reports from multiple sensors at possibly different locations and times, the system may be able to perform a higher-level analysis than is possible when only considering individual reports. As a result, the system may improve overall situation awareness. A probabilistic hypothesis correlation and analysis may be used.

FIG. 4 shows an illustrative example of the present system. A security reference model module 41 may be connected to a dynamic evidence aggregator 42. The security reference model 41 may incorporate a facility model 43, a physical security model 44 and attack models 45. It may have additional models or fewer models. The evidence aggregator 42 may have report inputs 46 connected to it. Report inputs 46 may include information or activities from examples such as IR motion detection, badges, RF identification, door contacts, asset tracking, ground radar information, metal detection, face recognition, activity detection, license plate detection, logon/logoff information, network authentication, and so on. Aggregator 42 may take information from model 41 and report inputs 46 and develop hypotheses 47 having degrees of probability. The hypotheses may be developed or affected by a physical sensors report module 48, a video detection report module 49 and a logical sensors report module 51. An output 52 may include hypotheses and alarms and an output 53 may include uninteresting hypothesis which can be archived.

Figure 5:
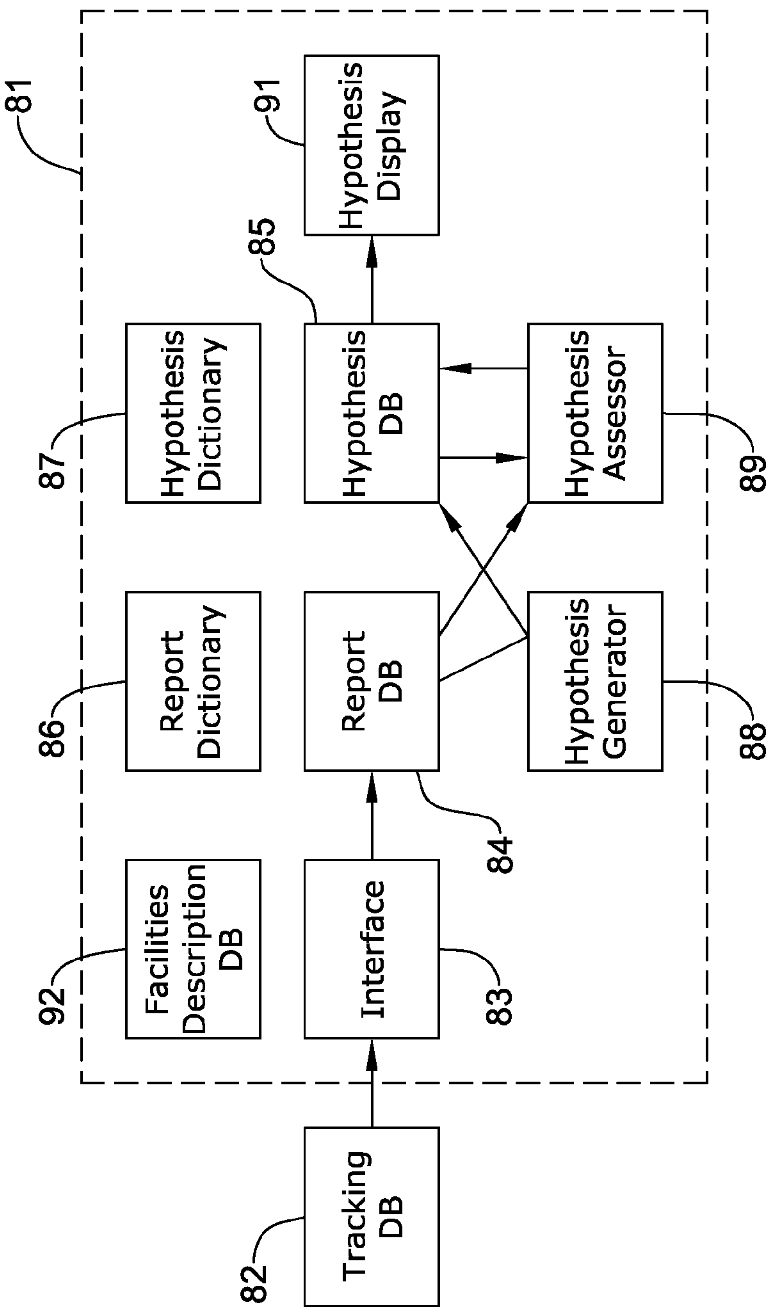
FIG. 5 is a block diagram of a hypothesis tracking system.

A tracking system 81 may include the following components, as shown in FIG. 5. An interface 83 connected to the tracking database component 82 may retrieve sensor reports from the database and convert them into a standard format for analysis. A report database 84 may store sensor reports that are currently under consideration in the standard analysis format. A hypothesis database 85 may store current hypotheses that have been generated to explain the reports under consideration. A report dictionary 86 may be a taxonomy of reports together with an indication of possible associated reports. A hypothesis dictionary 87 may be a taxonomy of hypotheses together with information on how critical they are and how likely they are to occur. A hypothesis generator 88 may generate hypotheses from the reports in the report database 84 to be sent to database 85. A hypothesis assessor 89 may be based on the system aggregation engine and assess the likelihood of each of the hypotheses. A hypothesis display 91 may allow the user to query the hypothesis DB 85 to display the current hypotheses ranked according to their likelihood.

Domain specific information, such as use case scenarios, the physical facility layout and the individual sensors and their locations, may be encoded in the report and hypothesis dictionaries for the prototype. It may be possible to derive some of this information directly from the facilities description database 92 shown in FIG. 5.

Operationally, the system may work as follows. Sensor reports may be entered into the report database (DB) 84 by the sensor report converter or interface 83 as they occur. When instructed to do so, the hypothesis generator 88 may read the current sensor reports in the report DB 84 and, using information from the report dictionary 86 and hypothesis dictionary 87, may construct a set of hypothesis that might explain the reports. It then enters these hypotheses into the hypothesis DB 85.

At this point there may be several competing hypotheses that could explain the reports seen. The hypothesis assessor 89 may evaluate these hypotheses using the aggregation engine and rank them based on its belief of which hypothesis is the most likely cause of the reports. The ranked hypotheses, and for each hypothesis the degree of confidence that it explains the reports, may then be recorded in the hypothesis DB 85 and be available for display.

The aggregation engine may use Bayesian nets and qualitative probability to arrive at its assessment of the likelihood of a particular hypothesis being the cause of the sensor reports. These assessments may be based on the current sensor reports so as new reports are added to the evidence; the assessments may change to reflect the new evidence.

The sensors that are used and the reports generated may include a door contact with door open and door closed, a pressure mat with an analog representation of weight, a motion detector with the degree of motion sensed, a badge reader with badge swiped and person identified (or not) and person authorized (or not) and person validated (or not) via biometrics, emergency exit alarm with emergency door opened, fire/smoke alarm with fire/smoke detected, face surveillance with identification validated (or not) and possible watch list match (numeric scale), iris surveillance with identification validated (or not), video surveillance with movement within range of camera, movement in the wrong direction, number of people in view, unusual activity (running, falling down, fighting), and change in stationary view (object moved, object left behind), multi-camera tracking with track movement through an area across multiple cameras and possibly track based on facial recognition, audio surveillance with sound within range of detector (could be used in areas where video is not allowed such as restrooms) and unusual activity (screaming, loud noises), asset tracking with track movement of an identifying token that is attached to a person or object, infrared beams with motion sensed (multiple beams could be used to sense direction of motion), laser range finder (LIDAR) which measures distance to an object, speed of movement, angle, and ground based radar with object sensor (used externally). There may also be other kinds of sensors that generate reports.

Evidence aggregation might be used to improve situation awareness in a physical security setting, specifically in a facility such as an airport. While there may be scenarios that describe very specific types of sensor reports, more extensive reporting may also be simulated using the sensor simulation capability. Sensor simulation may also include cases where an attacker might perform actions to blind or disable a sensor.

Figure 6:
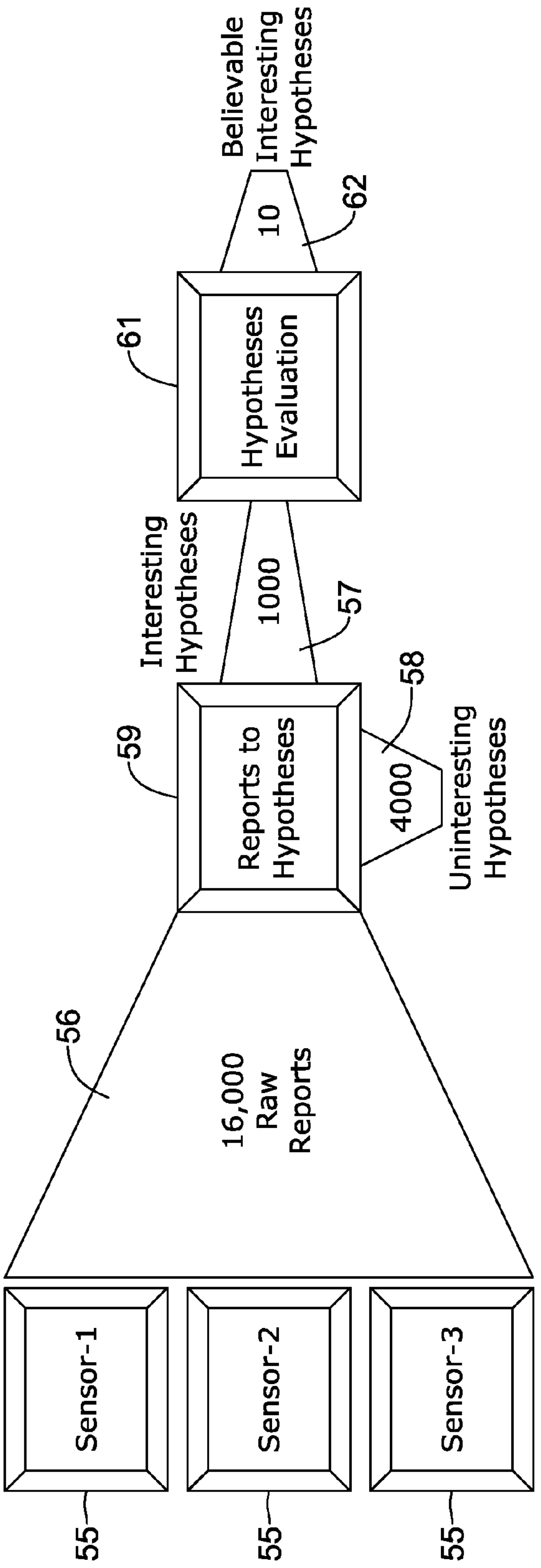
FIG. 6 is a flow diagram of an aggregation of data to establish a smaller number of hypotheses.

FIG. 6 provides an example of aggregation and reduction of many reports to a relatively manageable number of hypotheses. For instance, 16,000 raw reports 56 may come from various intrusion detectors or sensors 54. They may be clustered and aggregated into about 1000 interesting hypothesis 57 and 4000 uninteresting hypothesis 58 at a stage 59. Evidence analysis may occur at a stage 61 where the interesting hypotheses may be culled down to, for example, 10 believable interesting hypotheses 62.

Figure 7:
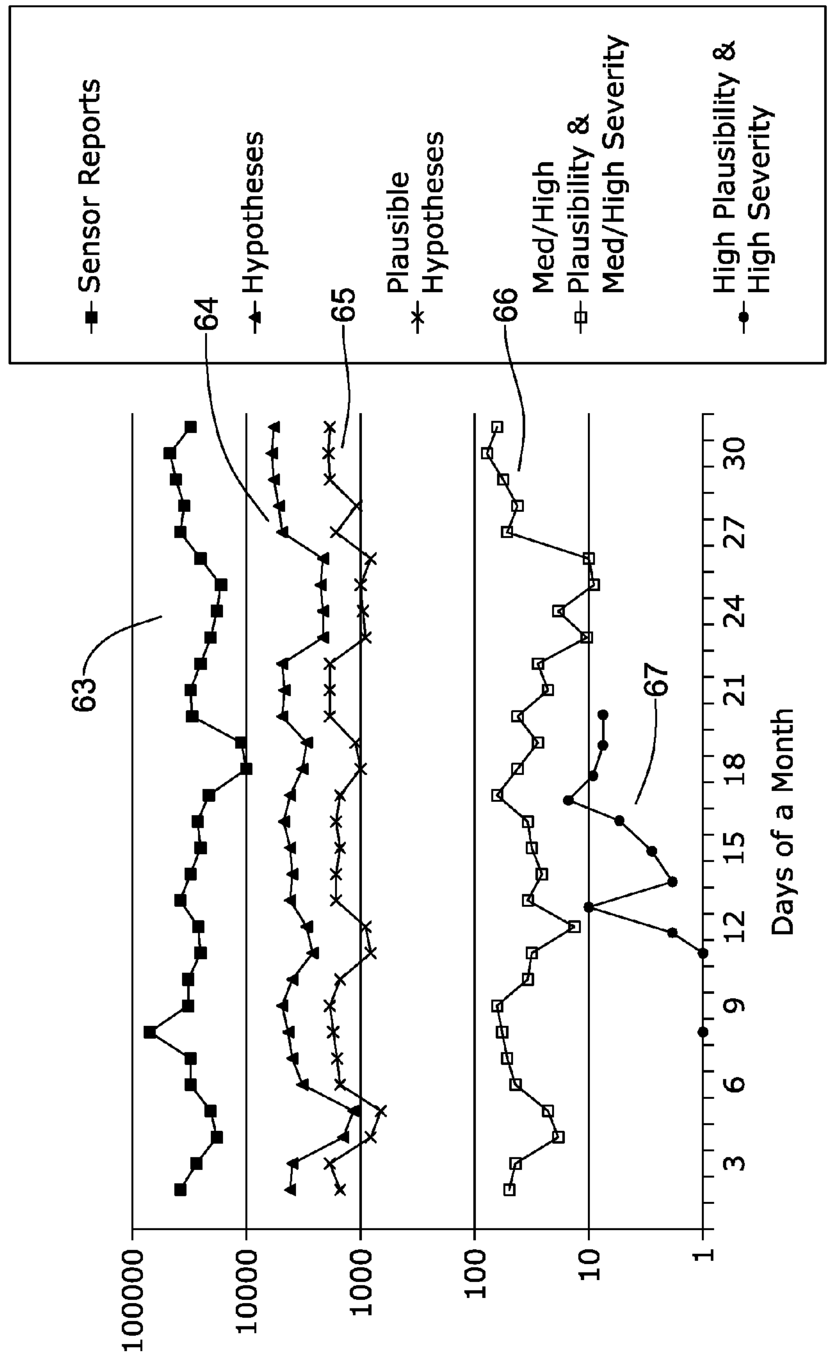
FIG. 7 is a graph showing a receipt of reports and establishment of hypotheses over a time period.

FIG. 7 is a graph showing the occurrence of reports during a month, as an example, and a resulting aggregation and clustering. First, there are the raw reports 63. Then, there are the hypotheses 64 and plausible hypotheses 65. Hypotheses 66 are those having medium to high plausibility and medium to high severity. Hypotheses 67 include those having high plausibility and high severity.

The functions or algorithms of the present system may be implemented in software or a combination of software and human implemented procedures in an illustrative example. The software may comprise computer executable instructions stored on computer readable media such as memory or other type of storage devices. The term "computer readable media" may also be used to represent carrier waves on which the software is transmitted. Further, such functions may correspond to modules, which are software, hardware, firmware or any combination thereof. Multiple functions may be performed in one or more modules as desired. The software may be executed on a digital signal processor, ASIC, microprocessor, or other type of processor operating on a computer system, such as a personal computer, server or other kind of computer system.

In the illustrative examples, methods described may be performed serially, or in parallel, using multiple processors or a single processor organized as two or more virtual machines or sub-processors. Moreover, still other illustrative examples may implement the methods as two or more specific interconnected hardware modules with related control and data signals communicated between and through the modules, or as portions of an application-specific integrated circuit. Thus, the exemplary process flow may be applicable to software, firmware, and hardware implementations.

Figure 8:
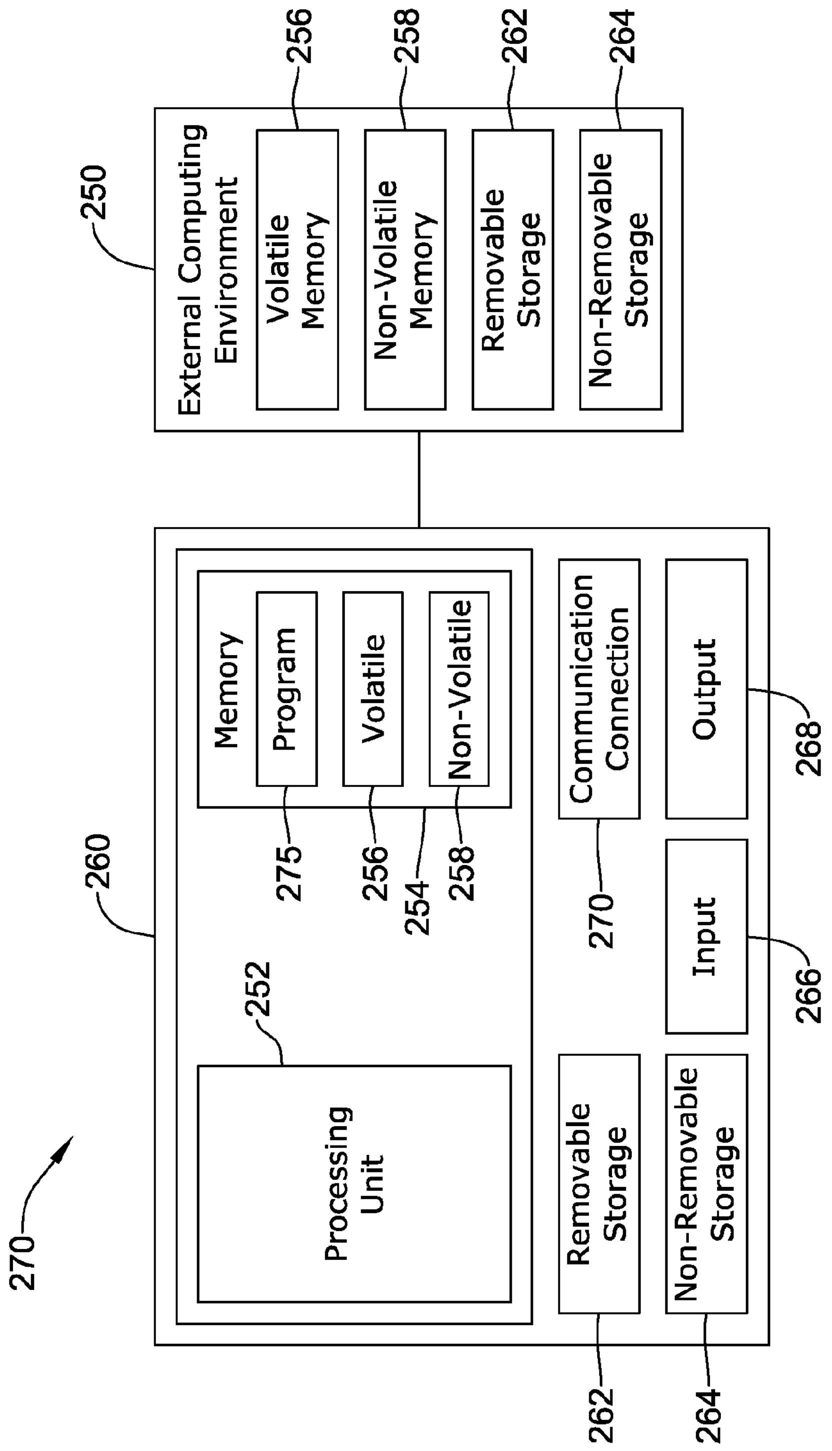
FIG. 8 shows a block diagram of a computer system that may be used to implement software portions of the system.

A block diagram of a computer system that executes programming for performing the above algorithm is shown in FIG. 8. A general computing device in the form of a computer 260 may include a processing unit 252, memory 254, removable storage 262, and non-removable storage 264. Memory 254 may include volatile memory 256 and non-volatile memory 258. Computer 260 may include—or have access to an external computing environment 250 that includes a variety of computer-readable media, such as additional volatile memory 256 and non-volatile memory 258, removable storage 262 and non-removable storage 264. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer 260 may include or have access to a computing environment that includes an input 266, an output 268, and a communication connection 270. The computer may operate in a networked environment using a communication connection to connect to one or more remote computers. The remote computer may include a personal computer (PC), server, router, network PC, access controller, device controller, a peer device or other common network node, or the like. The communication connection may include a local area network (LAN), a wide area network (WAN) or other networks.

Computer-readable instructions stored on a computer-readable medium may be executable by the processing unit 252 of the computer 260. A hard drive, CD-ROM, and RAM are some examples of articles including a computer-readable medium. For example, a computer program 275 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer system 270 to provide generic access controls in a COM based computer network system having multiple users and servers.

Figure 9:
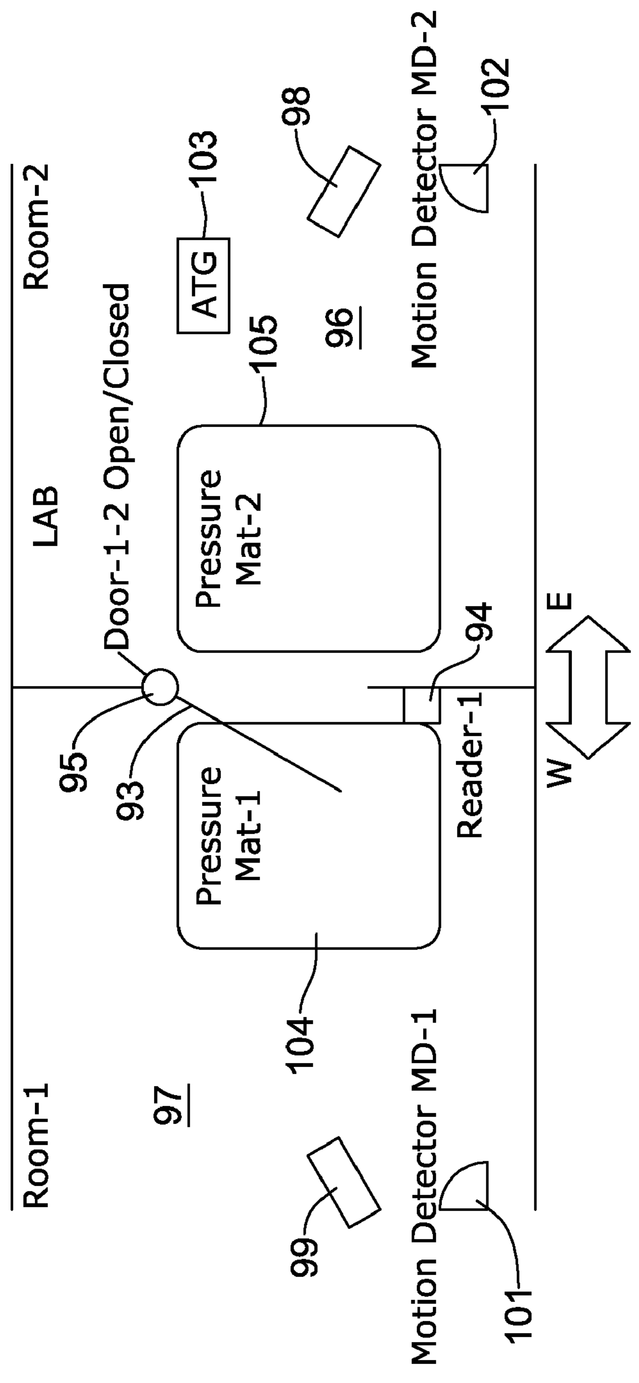
FIG. 9 shows a two-room layout having a door common to the rooms along with sensors.

An application of the method is shown in FIG. 9 which shows a physical layout with tailgating detection. Tailgating is the practice by which an unauthorized person transits a protected entry in sufficiently close proximity to an authorized person that the unauthorized person gains admittance. A configuration may include:

Entrance door 93—As in FIG. 9.
Fingerprint and/or badge reader 94 outside the door
Door contact switch 95
IR beam 99 outside door 93 in hallway 97
IR beam 98 inside door 93 in room 96
PIR motion sensor 101 outside the door in hallway
PIR motion sensor 102 inside the door
Newton ATG 103 on ceiling of room 96.

An attack goal may be to obtain unauthorized access to a restricted area 96 (ROOM-2) without proper authorization.

An attacker may also generate many false alarms and thus make the system unusable.

Key objects and actors may include:

STAFF—a staff member authorized for ROOM-2
ATTACKER—a person attempting to infiltrate ROOM-2 (96) from ROOM-1 (97)
TOKEN-1—an authentication token held by STAFF
MD-1—a motion detector 101 that sees ROOM-1 near DOOR-1-2 (93)

MD-2—a motion detector 102 that sees ROOM-2 near DOOR-1-2

ROOM-1—an unrestricted area 97

ROOM-2—a restricted, badged area 96

DOOR-1-2—a self-closing door 93 between ROOM-1 and ROOM-2, with lock controlled by computer that responds to READER-1 (94)

DOOR-1-2-O/C—a sensor 95 indicating whether DOOR-1-2 is in open or closed position.

MAT-1—a pressure sensitive mat 104 (or similar device) indicating something heavy near DOOR-1-2 in ROOM-1.

MAT-2—a pressure sensitive mat 105 indicating something heavy near DOOR-1-2 in ROOM-2.

READER-1—an authentication device 94 such as card-reader, fingerprint reader, badge reader, etc.

Alternate sensors may include video or IR beams and the Newton anti-tailgating (ATG) device 103.

The configuration may include the following properties. The door 93 may be a windowless steel security door with an electronically actuated lock. A central computer may monitor the six sensors, and make a decision about whether to unlock the door for a supplicant at READER-1. Anyone may open the door from ROOM-2 without presenting credentials. No assumptions are made about the information associated with the token other than it may satisfy a prescribed policy to authorize the holder to pass. It may or may-not uniquely identify the holder.

The staff may be trained to not practice nor consciously allow tailgating. It may be worth distinguishing two types of tailgating Collaborative (unauthorized user collaborates with an authorized user): This may be someone with authorized access deliberately taking steps to defeat the anti-tailgating mechanism. E.g., an employee bringing his girlfriend into the control room.

Non-cooperative (unauthorized user enters without the cooperation of an authorized user: This may be an authorized user who is not trying to help the tailgater. One may detect a second person who is attempting to tailgate early enough to prevent the door from unlocking if there was a potential tailgating situation, such as two people within 3 feet of the door.

The activity and observables below correspond to the sample or inputs to be provided.

(West-to-East Transit) Normal operation

| | Actual Activity | Observables |
|---|---|---|
| 1 | STAFF, headed East, approaches DOOR-1-2 from ROOM-1 | MD-1 indicates motion |
| 2 | STAFF stands at READER-1 | MAT-1 indicates mass |
| 3 | STAFF proffers TOKEN-1 to READER-1 | Computer authenticates and unlocks door |
| 4 | STAFF opens DOOR-1-2 | DOOR-1-2-O/C indicates "OPEN". |
| 5 | STAFF goes East through DOOR-1-2 | MAT-1 indicates "no-mass", MAT-2 indicates "mass present". |
| 6 | STAFF moves East into ROOM-2 | MD-2 indicates motion, MAT-2 indicates "no mass present" |
| 7 | DOOR-1-2 automatically closes | DOOR-1-2-O/C indicates "CLOSED" |

There may be malicious variants. In a variation tabulated below, the attacker may pose as an authorized person, and "tailgate" on the legitimate credentials of the staff member to gain access.

Approach

| | Actual Activity | Observables |
|---|---|---|
| 1 | STAFF, headed East, approaches DOOR-1-2 from ROOM-1 | MD-1 indicates motion |
| 2 | ATTACKER, headed East approaches DOOR-1-2 from ROOM-1 behind STAFF | MD-1 indicates motion |
| 3 | STAFF stands at READER-1 | MAT-1 indicates mass |
| 4 | STAFF proffers TOKEN-1 to READER-1 | Computer authenticates and unlocks door |
| 5 | STAFF opens DOOR-1-2 | DOOR-1-2-O/C indicates "OPEN". |
| 6 | STAFF goes East through DOOR-1-2 ATTACKER starts to follow | MAT-2 indicates "mass present", MAT-1 still indicates "mass present". |
| 7 | STAFF moves East into ROOM-2 | MD-2 indicates motion, |
| 8 | ATTACKER goes East through DOOR-1-2 | MAT-1 indicates "no mass present", MAT-2 indicates "mass present" |
| 9 | ATTACKER moves East into ROOM-2 | MD-2 indicates motion, MAT-2 indicates "no mass present" |
| 10 | DOOR-1-2 automatically closes | DOOR-1-2-O/C indicates "CLOSED" |

The attacker might have a very reasonable looking fake photo-ID and uniform. If the policy is for each person in turn to present his token for access, the attacker could let the staff member go first, then hold the door open, or otherwise prevent it from latching—a discreet interval later, the attacker may open the door and transit. Details of when pressure mats indicate mass may depend on how closely the attacker follows.

Noted problems may include no human attendants stationed at the door, possible lack of adherence by staff to protocol that might prevent tailgating, and an inability of sensors to distinguish between a person and a heavy cart or other piece of equipment.

Figure 10:
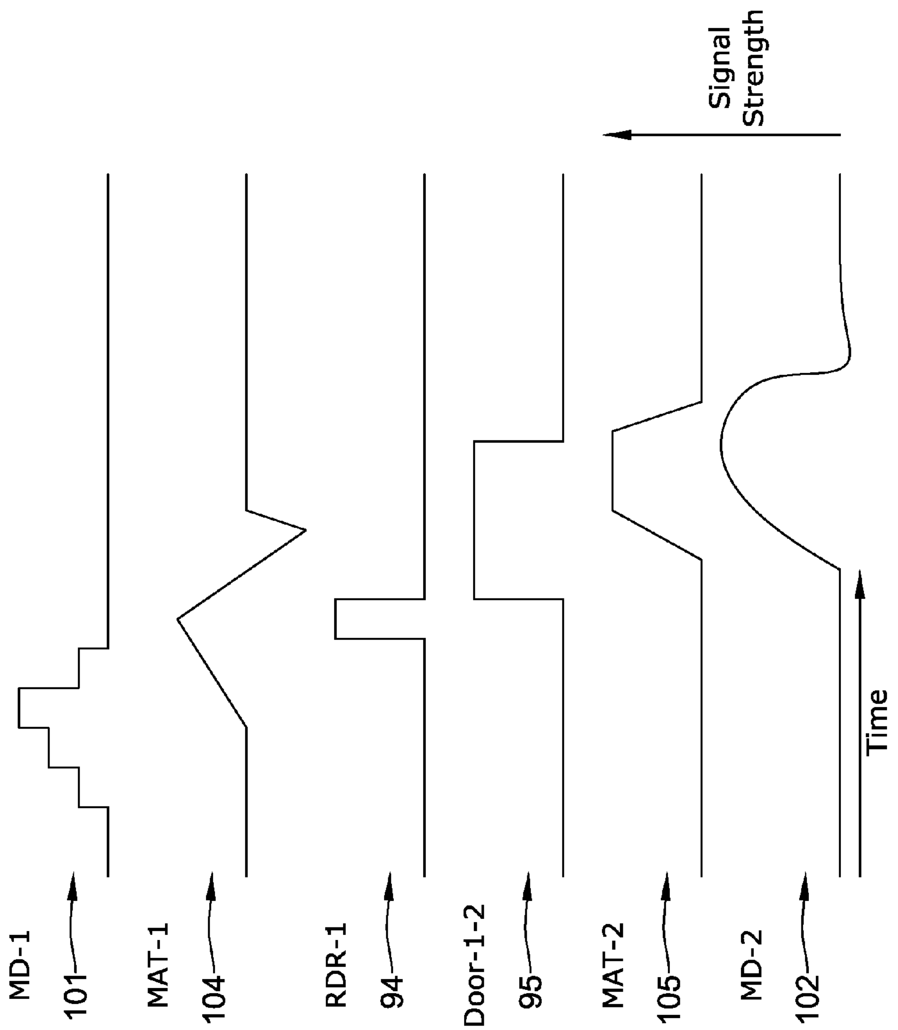
FIG. 10 is a sensor report timing diagram of normal transit by an authorized person.

In normal transit, there may be evidence aggregation where the sensors generate reports of activity in the temporal sequence of the scenario. Normal transit from West to East by an authorized person might look like the traces shown in FIG. 10. FIG. 10 shows an example of normal sensor report timing. The waveforms are numbered to correspond to the noted components having the same numbers 101, 104, 94, 95, 105 and 102, which are the motion detector 1, pressure mat 1, reader 1, door O/C sensor, pressure mat 2 and motion detector 2, respectively.

This simple activity may generate the six reports shown in the timing diagram of FIG. 10, one per sensor. Each report may have a starting and ending time and a sensor identifier and tag indicating the state of note, e.g., "authenticated Bob" or "door open".

Figure 11:
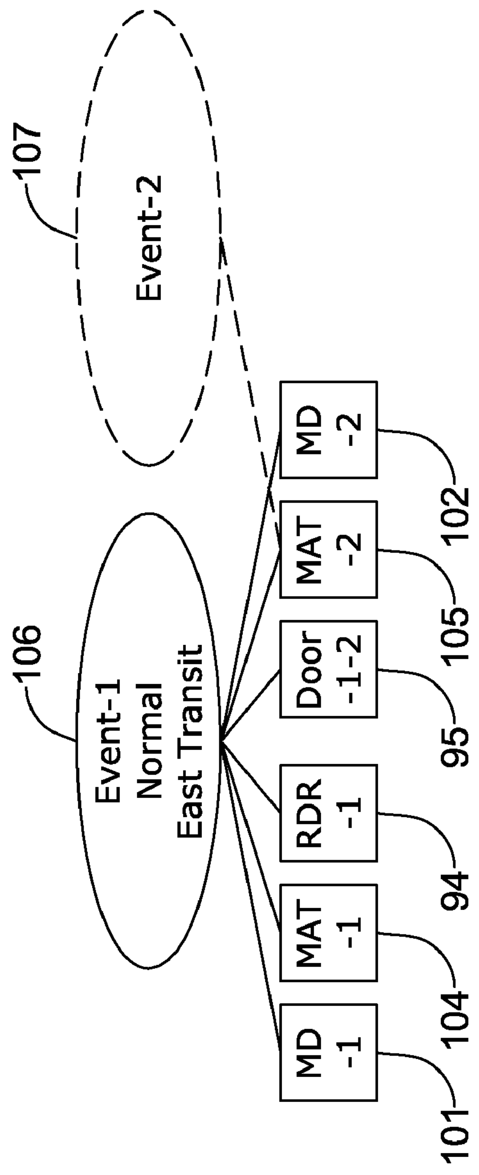
FIG. 11 shows a simple aggregation of reports to support hypotheses.

FIG. 11 shows a simple aggregation of reports (squares) to support hypotheses (ovals). FIG. 11 also illustrates a hypothesis 106 and a possible hypothesis 107 and a relationship with the reports 101, 104, 94, 95, 105 and 102. These reports may be aggregated by algorithms into a hypothesis of "Normal East Transit". Some of the reports may also support other hypotheses, although these may be evaluated as less plausible.

Figure 12:
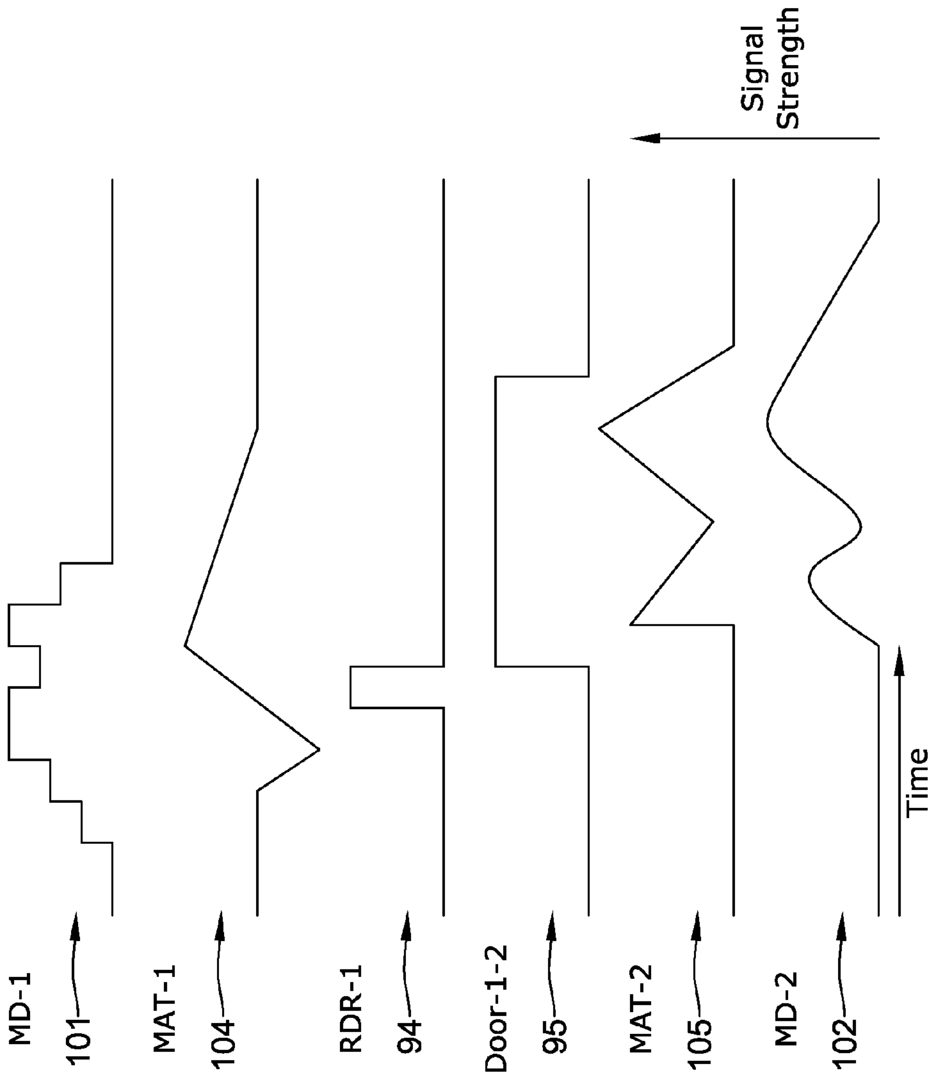
FIG. 12 shows an example sensor report timing for tailgating.

FIG. 12 shows an example sensor report timing for tailgating. The temporal sequence of reports that indicates possible tailgating may differ from the normal temporal sequence in that there is overlap of sensor reports that is not present in the normal sequence. For example, the MAT-1 sensor 104 might still be reporting pressure when the MD-2 sensor 102 starts indicating motion. Note that unreliability of the sensors may be something that the system will be able to reason about.

Figure 13:
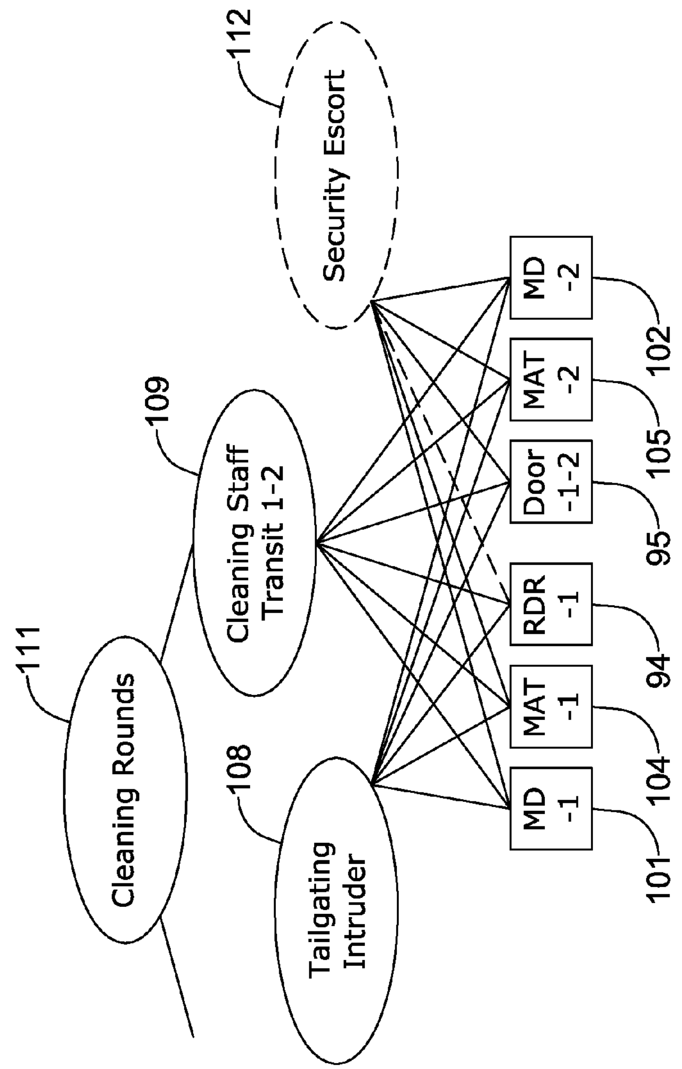
FIG. 13 shows reports aggregated into a hypothesis of tailgating.

As shown in FIG. 13 these reports may be aggregated into a hypothesis 108 of "Tailgating". However, with some additional plausible assumptions, there are a number of other hypotheses, cleaning staff transit 109, cleaning rounds 111 and security escort transit 112, that the system would evaluate to explain the sequence of reports.

Suppose that there are a variety of roles, identifiable by badges, such as:

Security guard

Pilot/crew

Cleaning

Maintenance

Moreover, suppose that:

The reader 94 is able to identify the person and the role for which the person is authorized.

All people with badges are supposed to use their badge when passing through the door.

Only a security guard is authorized to take people without badges through the door.

The reports above might then be associated by the system with alternative possible hypothesis as shown in the FIG. 13.

Someone is actually tailgating.

A security guard is escorting someone through the building.

The cleaning staff is pulling a cart through the door.

FIG. 13 shows multiple, hierarchical hypotheses. Other hypotheses, such as maintenance people bringing equipment through the door, could be included as well.

The badge reader may indicate the role of the person authenticated at the door, and this information may be used in hypothesis formation. In the example of FIG. 13, the reports may support the hypothesis 109 of cleaning staff going through the door with a cart since one could suppose that a cleaning role badge was presented. The security escort hypothesis 112 may be rejected for that reason.

Using video surveillance, it might be possible to add additional reports to help identify the hypothesis; for example, the video might (with a certain probability) be able to distinguish a cleaning cart or a piece of equipment from a person alone; or it may be able to estimate the number of people that passed through the door.

The system may also be able to construct and use a higher-level hypothesis to help refine its assessment of the likelihood of each hypothesis. FIG. 13 shows a "cleaning rounds" hypothesis 111 that may be supported by the "cleaning staff transit" hypothesis 109 for the particular door 93 at approximately the time in question. If other reports that are part of the "cleaning rounds" 111, such as other badged entries in an appropriate, related timeframe, were also corroborated by reports, then the system may increase the likelihood that it had actually observed the normal activities of the cleaning crew (109), not a hostile tailgater (108).

Figure 14:
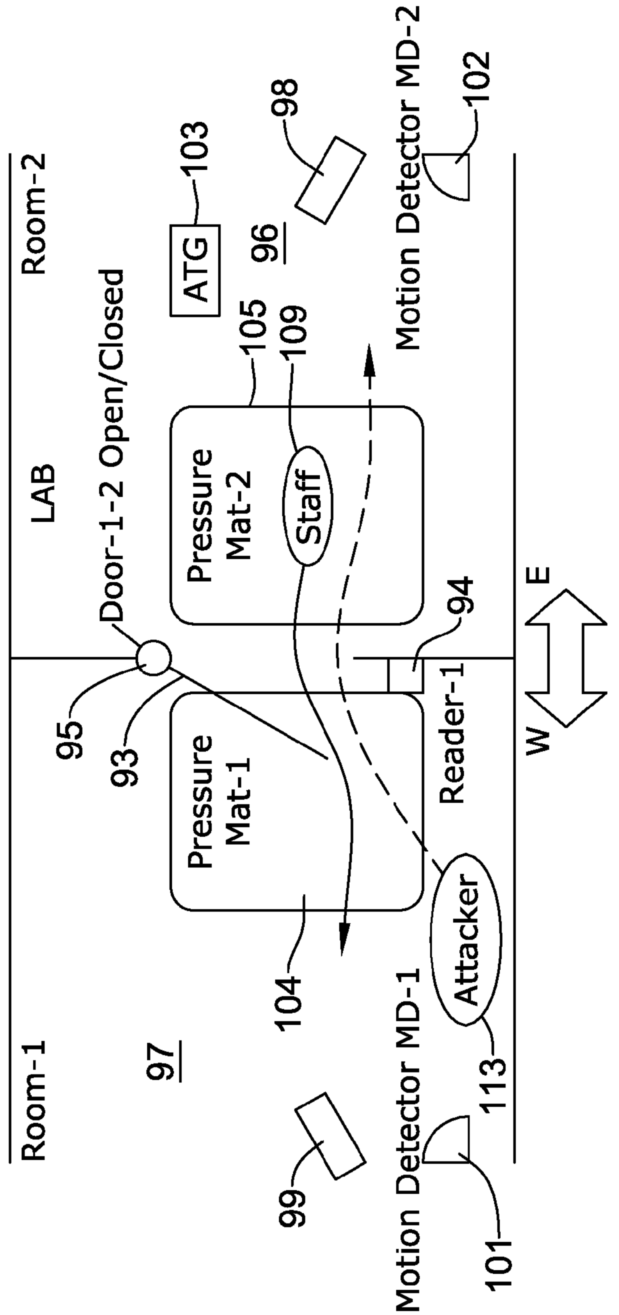
FIG. 14 shows a physical layout like that of FIG. 9 with backflow indicated.

Another scenario may be backflow through a restricted entrance. This example is a variant of the first scenario. The difference may lie in the approach taken by an attacker 113. In this scenario, the attacker 113 may attempt to enter through the door 93 before it closes after someone else has exited. FIG. 14 shows a physical layout (similar to that of FIG. 9) with backflow indicated.

An attack goal may be to obtain access to a restricted area (ROOM-2) without proper authorization.

The key objects and actors include the following.

STAFF—an staff member authorized for ROOM-2

ATTACKER—a person attempting to infiltrate ROOM-2 from ROOM-1

TOKEN-1—an authentication token held by STAFF

MD-1—a motion detector 101 that sees ROOM-1 near DOOR-1-2

MD-2—a motion detector 102 that sees ROOM-2 near DOOR-1-2

ROOM-1—an unrestricted area 97

ROOM-2—a restricted area 96

DOOR-1-2—a self-closing door 93 between ROOM-1 and ROOM-2, with lock controlled by computer that responds to READER-1

DOOR-1-2-O/C—a sensor 95 indicating whether DOOR-1-2 is in open or closed position.

MAT-1—a pressure sensitive mat 104 (or similar device) indicating something heavy near DOOR-1-2 in ROOM-1.

MAT-2—a pressure sensitive mat 105 indicating something heavy near DOOR-1-2 in ROOM-2.

READER-1—an authentication device 94 such as card-reader, fingerprint reader, badge reader, etc.

The assumptions may include the following. The door 93 may be a windowless steel security door with an electronically actuated lock. A central computer may monitor the six sensors, and make a decision about whether to unlock the door for a supplicant at READER-1. Anyone might open the door from ROOM-2 without presenting credentials. There are no assumptions about the information associated with the token other than it may be sufficient to authorize the holder to pass. It may or may not uniquely identify the holder. Staff may have been trained to not practice nor consciously allow backflow. More elaborate problems may be analyzed in which the reader uses biometric or multifactor authentication, but this simple use case illustrates the invention.

The activity and observables below correspond to the sample sensor inputs to be provided.

(East-to-West transit) Normal operation

| | Actual Activity | Observables |
|---|---|---|
| 1 | STAFF, headed West, approaches DOOR-1-2 from ROOM-2 | MD-2 indicates motion |
| 2 | STAFF stands at DOOR-1-2 | MAT-2 indicates mass |
| 3 | STAFF opens DOOR-1-2 | DOOR-1-2-O/C indicates "OPEN" |
| 4 | STAFF goes through DOOR-1-2 | MAT-2 indicates "no-mass", MAT-1 indicates "mass present". |
| 5 | STAFF moves into ROOM-1 | MD-1 indicates motion MAT-1 indicates "no mass present". |
| 6 | DOOR-1-2 automatically closes | DOOR-1-2-O/C indicates "CLOSED" |

Malicious variants—In this variation, the attacker may lurk behind the door waiting for someone to exit. The door may be held open briefly and the attacker may slip into the restricted area.

| Approach | | | |
|---|---|---|---|
| | Actual Activity | Observables |
| 1 | ATTACKER, headed East, approaches DOOR-1-2 | MD-1 indicates motion |
| 2 | ATTACKER stands in shadow of DOOR-1-2, carefully staying off MAT-1 | |
| 3 | STAFF, headed West, approaches DOOR-1-2 from ROOM-2 | MD-2 indicates motion |
| 4 | STAFF stands at DOOR-1-2 | MAT-2 indicates "mass present" |
| 5 | STAFF opens DOOR-1-2 | DOOR-1-2-O/C indicates "OPEN" |
| 6 | STAFF goes West through DOOR-1-2 | MAT-2 indicates "No mass", MAT-1 indicates "mass present". |
| 7 | STAFF moves West into ROOM-1 | MD-1 indicates motion MAT-1 indicates "No mass". |
| 8 | ATTACKER grabs door before it closes completely | MAT-1 indicates "mass present" |
| 9 | ATTACKER goes East through DOOR-1-2 | MAT-2 indicates "mass present" MAT-1 indicates "No mass" |
| 10 | DOOR-1-2 automatically closes | DOOR-1-2-O/C indicates "CLOSED" |
| 11 | ATTACKER goes West into ROOM-2 | MD-2 indicates motion |

Several noted problems may be that there are no human attendants stationed at this door; there may be a possible lack of adherence by staff to protocol that might prevent backflow.

Figure 15:
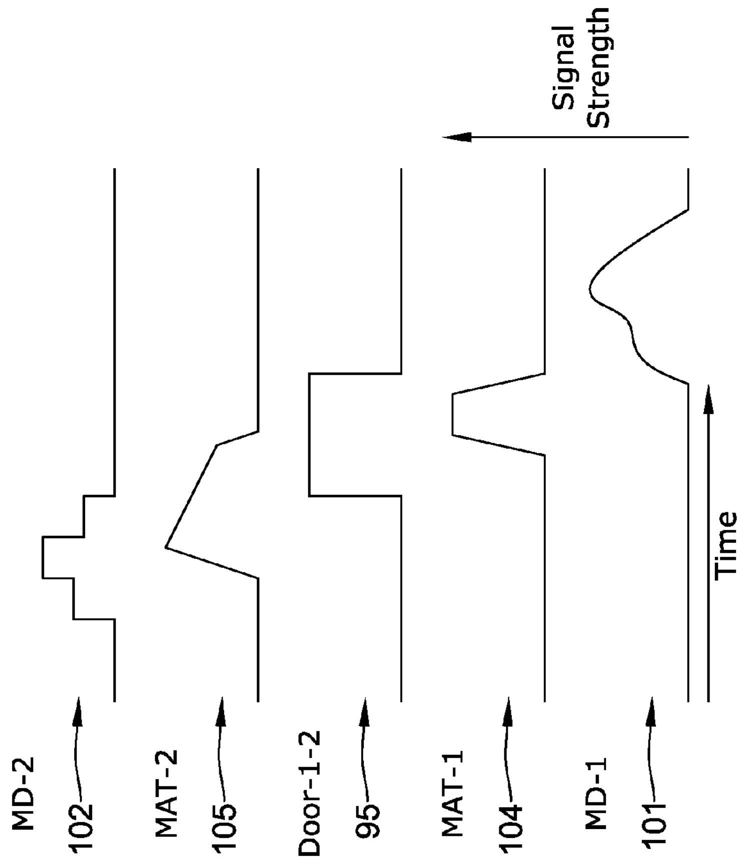
FIG. 15 shows an example of normal sensor response timing of an exit by an authorized person.

Normal transit may involve evidence aggregation. The sensors 102, 105, 95, 104 and 101 generate reports of activity in the temporal sequence of the scenario. Normal transit from East to West by an authorized person might look like the traces shown in FIG. 15 which shows an example of normal sensor response timing on exit.

Figure 16:
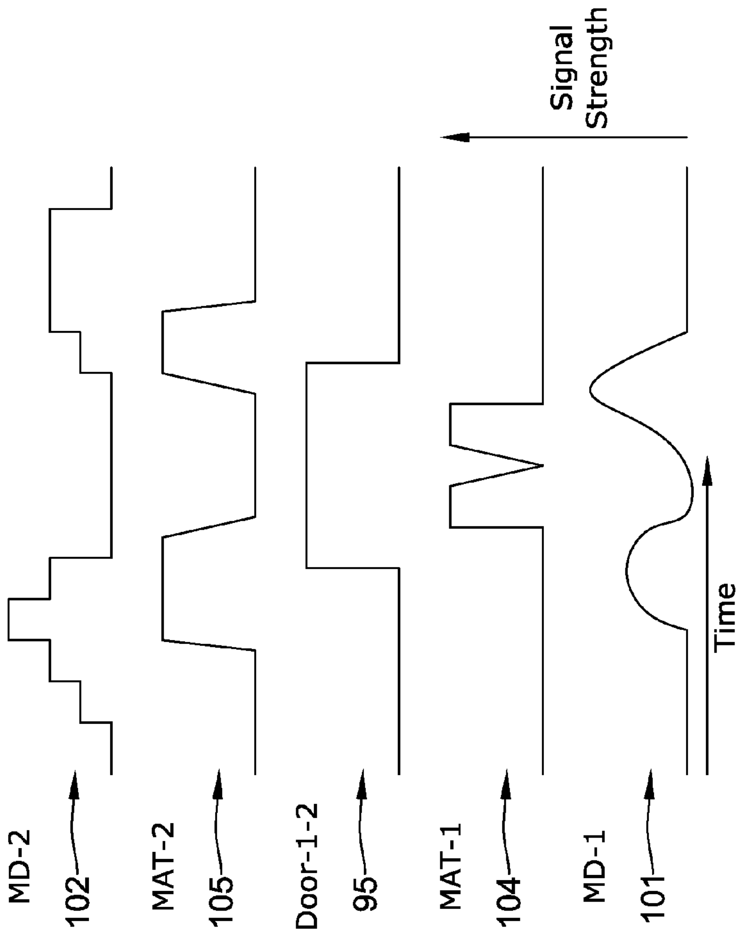
FIG. 16 shows sensor report timing of a possible backflow.
Figure 17:
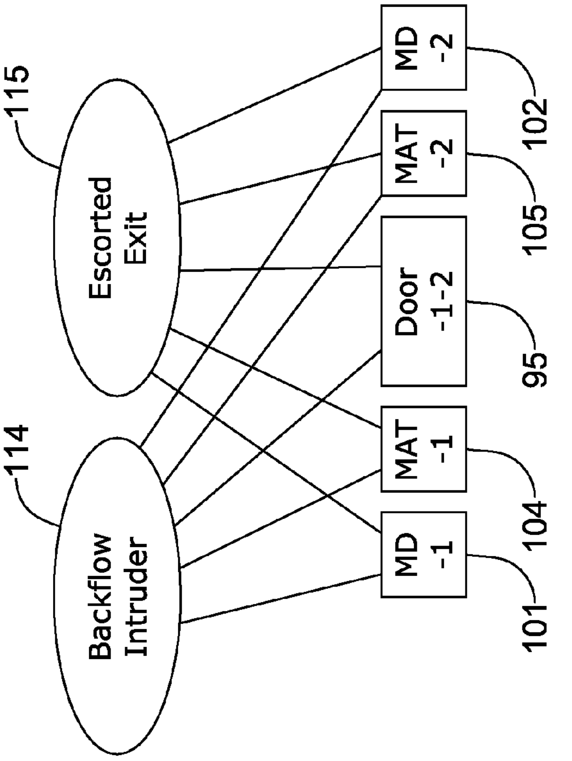
FIG. 17 shows possible hypothesis of a backflow intruder or an escorted exit shown in FIG. 16.

The temporal sequence of reports that indicates possible backflow may differ from the normal temporal sequence in that there are additional sensor reports that are not present in the normal sequence. For example, the MAT-2 sensor 105 might still be reporting pressure when the MD-1 sensor 101 is indicating motion as indicated in FIG. 16 which shows possible sensor report timing for a backflow hypothesis. These reports may be aggregated by into a hypothesis of "Backflow". Another possible explanation might be that a badged employee had escorted a visitor out the door and then returned inside. One may detect the attacker outside of the door and/or detect that two persons approached the door to exit. FIG. 17 shows possible hypothesis of a backflow intruder 114 or an escorted exit 115 for reports 101, 104, 95, 105 and 102 shown in FIG. 16.

Reports from other sensors may be used by the system to help determine which of the two hypotheses was more likely. For example, if the badges were assets that could be tracked, and if tracking indicated that a badged employee had only opened the door 93 and then returned back in, then the escorted exit hypothesis 115 may be deemed most likely. Whereas if the tracking indicated that a badged employee had left, then the backflow hypothesis 114 (of FIG. 18) might be deemed most likely. Similarly, video or facial recognition sensors might also support one or the other hypothesis and allow the system to conclude which hypothesis was more likely.

Figure 18:
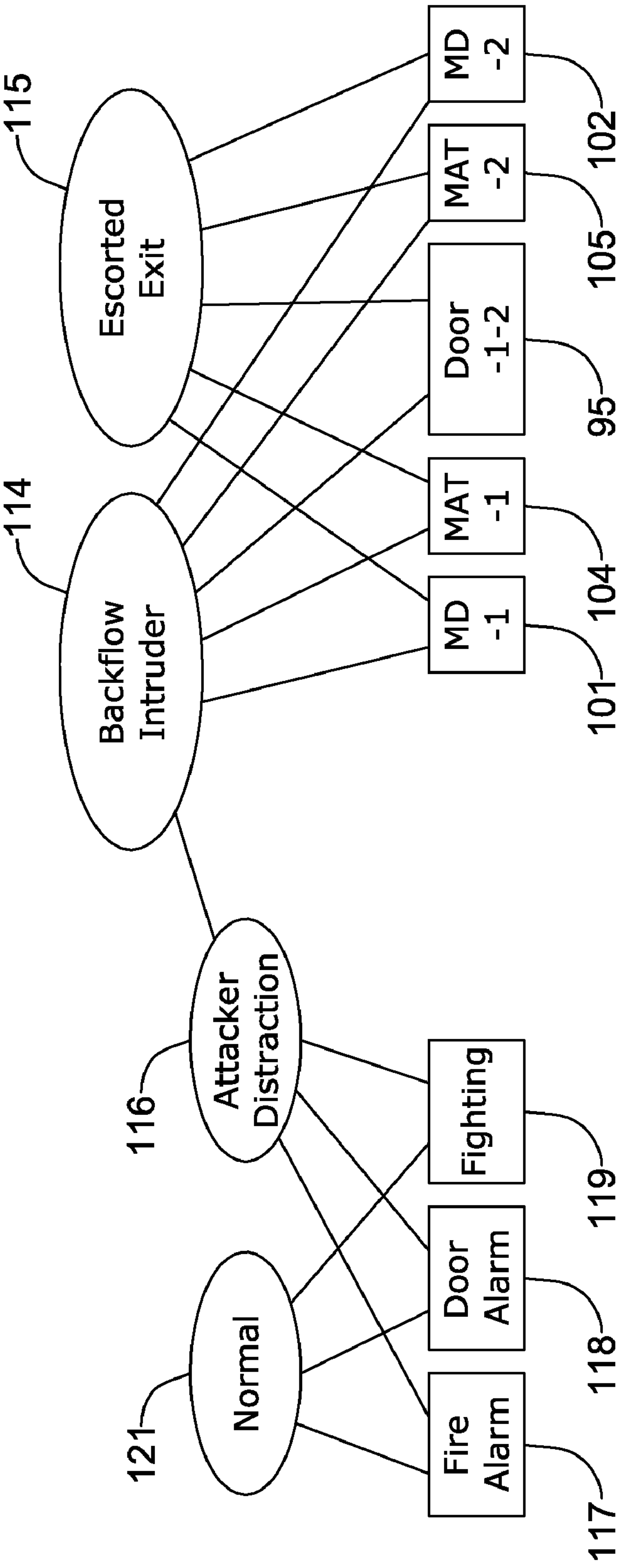
FIG. 18 shows that distraction activity may lend support to a backflow hypothesis.

This scenario might also include a distraction component 116 that the attacker uses to focus the person exiting the door away from his actions. This is illustrated in FIG. 18 which shows that a possible distraction activity 116 may lend support to the backflow hypothesis 114. An accomplice might create a diversion that causes someone within the area to come out to see what is happening and possibly to help. When he hurriedly exits, the attacker 113 (of FIG. 14) may be able to sneak past unnoticed. A presence of reports that might suggest a distraction, such as an instance of a nearby fire alarm 117 or door alarm 118 or fighting 119 (of FIG. 18) in a nearby area, may strengthen support for the backflow hypothesis, even though those reports could occur during normal conditions 121.

Biometrics might be applied to a greater extent to address these problems. For example, face recognition may determine that the person entering room 2 (96) was or was not the person who exited room 2. A face (or whole body including hair and clothes) recognition system may recognize that the person who was outside the door 93 is now inside the door though the "recognition" system does not know the name of the person (i.e., they are not enrolled as an employee but may be tagged as stranger #1 near door X at 8:00 AM.).

Figure 19:
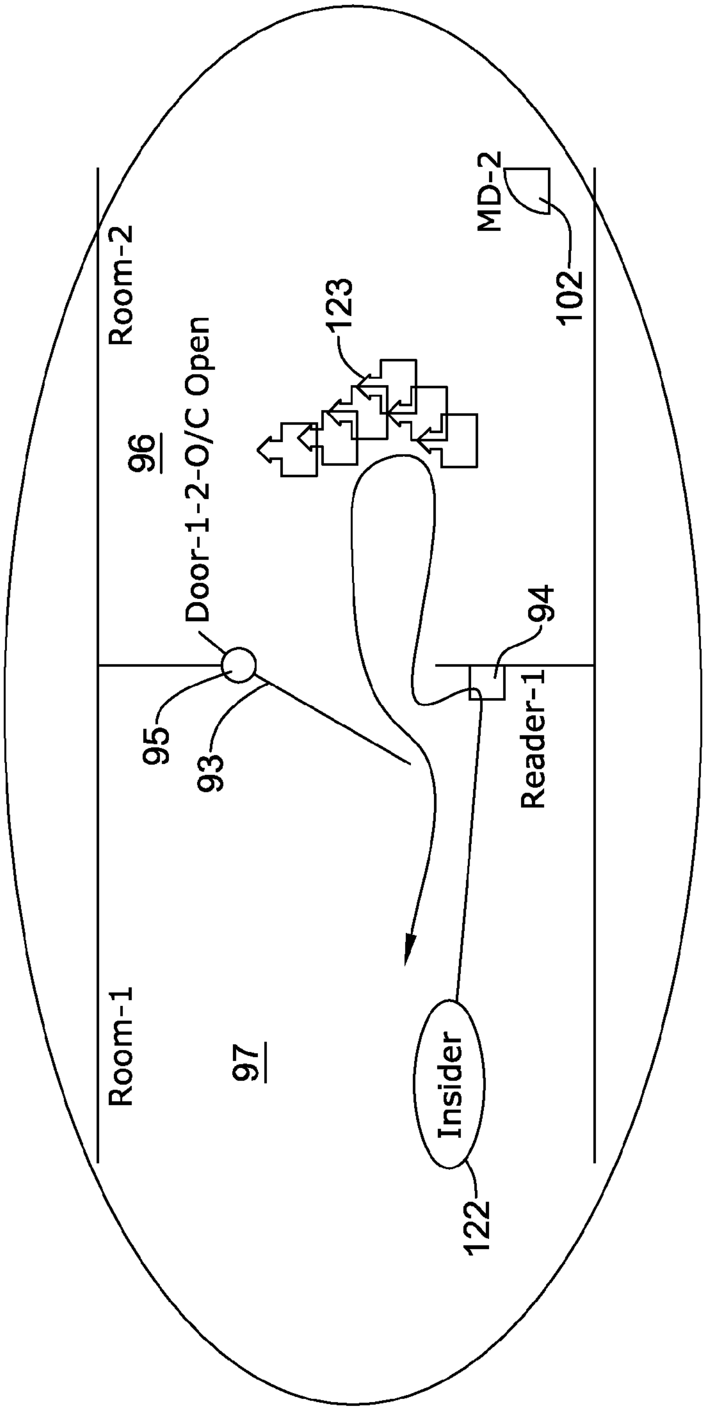
FIG. 19 shows a correlation of movement over time and location of suspicious activity.

Anomalous behavior by an authorized individual may be a scenario which focuses on an authorized individual and correlation of actions by the individual that might indicate the individual to be a malicious insider 122. FIG. 19 shows a correlation of movement over time and location of suspicious activity.

An attack goal may be the use authorized access to ROOM-2 (96) for illegal gain. The following shows the key actors and objects.

STAFF—authorized user

INSIDER (122)—STAFF with malicious intent

TOKEN-1—authentication token held by INSIDER 122

ROOM-1—an unrestricted area 97

ROOM-2—a restricted area 96 containing objects 123 of value

DOOR-1-2—a door 93 separating ROOM-1 from ROOM-2

DOOR-1-2-O/C—a sensor 95 indicating whether DOOR-1-2 is open or closed READER-1—authentication device 94 such as a card reader, fingerprint reader, badge reader, etc.

MD-2—motion detector 102 observing ROOM-2

The following items may be assumed. ROOM-2 (96) is normally unoccupied. STAFF enters ROOM-2 for only brief periods to pick up objects or to drop off objects. Objects 123 contained in ROOM-2 are suitably indexed for rapid retrieval or storage. In an airport context, ROOM-2 might be the unclaimed baggage storage room. INSIDER 122 does not wish to be observed by STAFF when performing illegal activity (e.g., searching bags). DOOR-1-2 (93) is the only entry/exit for ROOM-2. The door 93 may be a windowless steel security door with an electronically actuated lock. A central computer may monitor the three sensors, and make a decision about whether to unlock the door for a supplicant at READER-1 (94). Anyone may open the door from within ROOM-2 without presenting credentials. One need not make assumptions about the information associated with the token other than it may be sufficient to authorize the holder to pass. It may or may not uniquely identify the holder. More elaborate problems could be posed in which the reader uses biometric or multifactor authentication, but this should not affect the current simple use case. Staff may have been trained to not practice nor consciously allow tailgating or backflow through the door 93.

The following is a table for normal operation.

| | Actual Activity | Observables |
|---|---|---|
| 1 | STAFF approaches DOOR-1-2 from ROOM-1 | None |
| 2 | STAFF proffers TOKEN-1 to READER-1 | Computer authenticates and unlocks door |
| 3 | STAFF opens DOOR-1-2 | DOOR-1-2-O/C indicates "OPEN". |
| 4 | STAFF enters ROOM-2 from ROOM-1 | MD-2 indicates motion. |
| 5 | DOOR-1-2 automatically closes | DOOR-1-2-O/C indicates "CLOSED" |
| 6 | STAFF moves about ROOM-2 for a brief time | MD-2 observes motion |
| 7 | STAFF opens DOOR-1-2 | DOOR-1-2-O/C indicates "OPEN" |
| 8 | STAFF exits ROOM-2 into ROOM-1 | MD-2 observes no motion |
| 9 | DOOR-1-2 closes | DOOR-1-2-O/C indicates "CLOSED" |
| | Variant 1 - Malicious | |
| 1 | INSIDER approaches DOOR-1-2 from ROOM-1 | None |
| 2 | INSIDER proffers TOKEN-1 to READER-1 | Computer authenticates and unlocks door |
| 3 | INSIDER opens DOOR-1-2 | DOOR-1-2-O/C indicates "OPEN". |
| 4 | INSIDER enters ROOM-2 from ROOM-1 | MD-2 indicates motion. |
| 5 | DOOR-1-2 automatically closes | DOOR-1-2-O/C indicates "CLOSED" |
| 6 | INSIDER moves about ROOM-2 for an extended time | MD-2 observes motion; Observed time exceeds a threshold. |
| 7 | INSIDER opens DOOR-1-2 | DOOR-1-2-O/C indicates "OPEN" |
| 8 | INSIDER exits ROOM-2 into ROOM-1 | MD-2 observes no motion |
| 9 | DOOR-1-2 closes | DOOR-1-2-O/C indicates "CLOSED" |
| | Variant 2 - Malicious | |
| 1 | INSIDER approaches DOOR-1-2 from ROOM-1 | None |
| 2 | INSIDER proffers TOKEN-1 to READER-1 | Computer authenticates and unlocks door |
| 3 | INSIDER opens DOOR-1-2 | DOOR-1-2-O/C indicates "OPEN". |
| 4 | INSIDER enters ROOM-2 from ROOM-1 | MD-2 indicates motion. |
| 5 | DOOR-1-2 automatically closes | DOOR-1-2-O/C indicates "CLOSED" |
| 6 | STAFF approaches DOOR-1-2 from ROOM-1 | None |
| 7 | STAFF proffers TOKEN-1 to READER-1 | Computer authenticates and unlocks door |
| 8 | STAFF opens DOOR-1-2 | DOOR-1-2-O/C indicates "OPEN". |
| 9 | STAFF enters ROOM-2 from ROOM-1 | MD-2 indicates motion. |
| 10 | DOOR-1-2 automatically closes | DOOR-1-2-O/C indicates "CLOSED" |
| 11 | STAFF moves about ROOM-2 for a brief time | MD-2 observes motion |
| 12 | STAFF opens DOOR-1-2 | DOOR-1-2-O/C indicates "OPEN" |
| 14 | DOOR-1-2 closes | DOOR-1-2-O/C indicates "CLOSED" |
| 15 | INSIDER moves about ROOM-2 for an extended time | MD-2 observes motion; Observed time exceeds a threshold. |
| 16 | INSIDER opens DOOR-1-2 | DOOR-1-2-O/C indicates "OPEN" |
| 17 | INSIDER exits ROOM-2 into ROOM-1 | MD-2 observes no motion |
| 18 | DOOR-1-2 closes | DOOR-1-2-O/C indicates "CLOSED" |

Some of the noted problems may include some of the following. There are no human attendants stationed at this door 93 to validate who actually enters and exits ROOM-2 (96). The sensor MD-2 (102) may be fooled if STAFF or INSIDER remains motionless for an extended period; however, the system should be able to deduce the presence of individuals from DOOR-1-2-O/C (95).

A technology impact may be that while the motion detector may indicate the presence of someone in the room, it does not necessarily indicate who the person is. In a situation where multiple people may have access to the room, such as Variant 2 above, it may be necessary to use other sensors to track who is actually in the room. Asset tracking of badges, or possibly facial recognition sensors, might be possible approaches.

Figure 20:
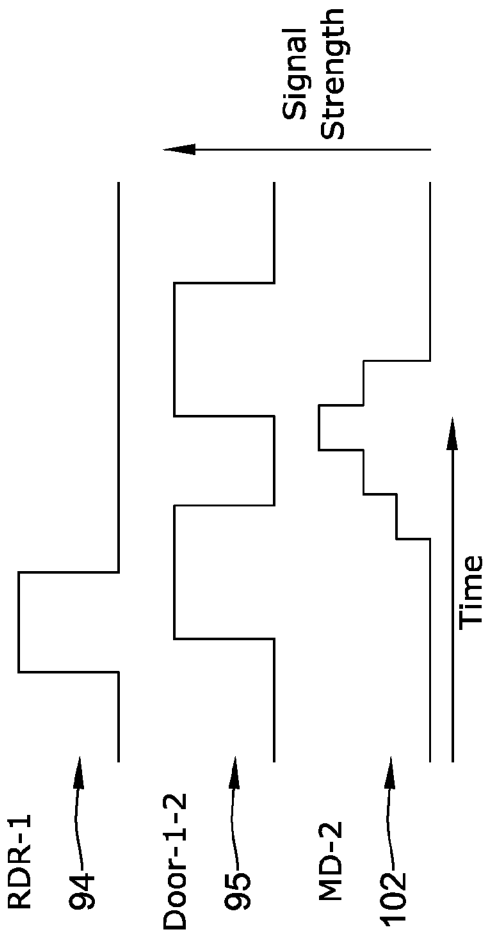
FIG. 20 shows normal sensor report timing of normal behavior, where a reader is activated for badge reading for the door to open so a person may enter with a door sensor showing the opening and closing.
Figure 21:
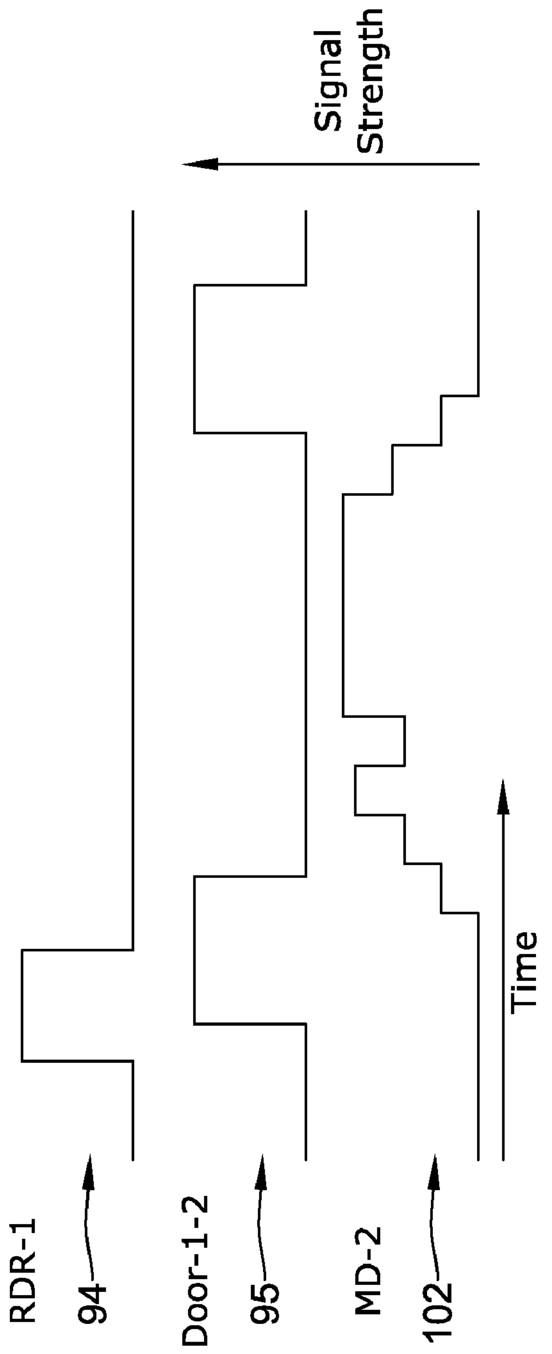
FIG. 21 shows anomalous sensor report timing in that the period of time between door openings as indicated by a door sensor and a motion detector appears to be substantially longer than the respective periods indicated in FIG. 20.

Additional Figures may illustrate aspects of the scenarios. FIG. 20 shows normal sensor report timing of normal behavior, where the reader 94 is activated for badge reading for the door 93 to open so a person may enter with the door sensor 95 showing the opening and closing. The door 93 may be closed while the motion detector 102 indicates motion in room 96. The door 93 opens momentarily according to sensor 95 for the person to exit. The motion detector 102 ceases to indicate motion shortly after the door 93 is opened. Relative to malicious variants, an employee may linger inside the room 96 in variant 1. Correspondingly, FIG. 21 may show anomalous sensor report timing in that the period of time between the door 93 openings as indicated by sensor 95 and the motion detector 102 indication appear to be substantially longer than the respective periods indicated in FIG. 20.

Figure 22:
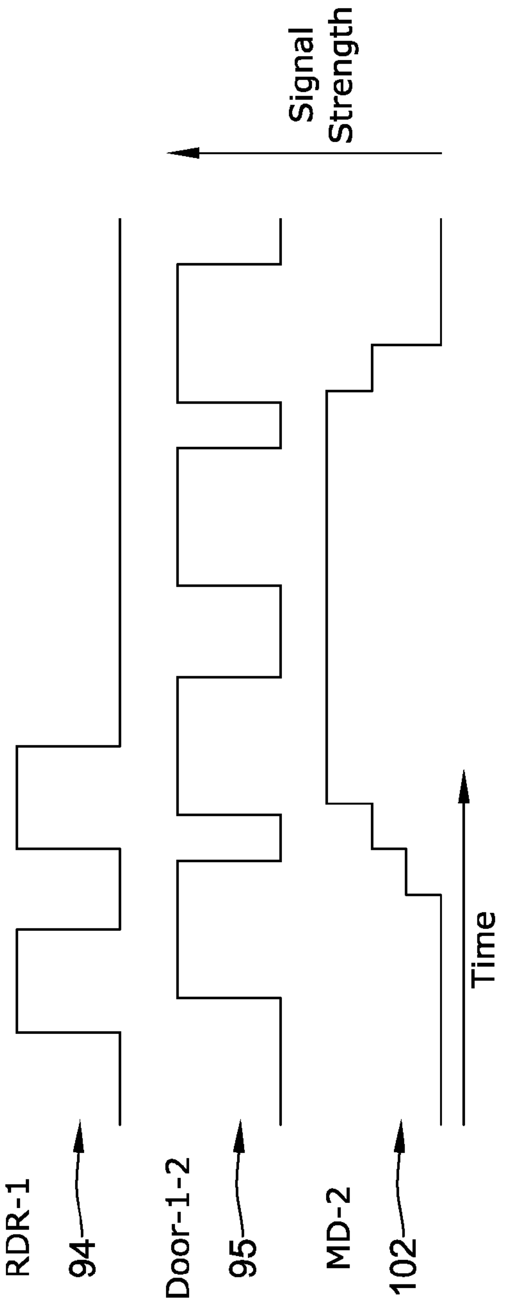
FIG. 22 shows possible anomalous sensor report timing relative to reader, door and motion sensors.

In variant 2, two employees may be in the room at the same time, and FIG. 22 shows possible anomalous sensor report timing relative to sensors 94, 95 and 102. Variant 2 may or may not be an example of anomalous behavior depending on who exits the room first. If the first individual to enter is the first to exit, then the behavior may match the normal pattern. If the first is the last to exit, then the behavior may match the anomalous pattern. To determine which pattern to match may require an additional sensor, such as asset tracking of a badge or face recognition that could identify the person in the room 96.

In this scenario, the distinguishing feature of the anomalous behavior may be that the individual remains in the restricted area for a longer period of time than normal. However, in and of itself, such behavior may not be malicious, but merely an isolated instance of the person being temporarily distracted, or possibly medically disabled, while in the room resulting in a longer presence.

Figure 23:
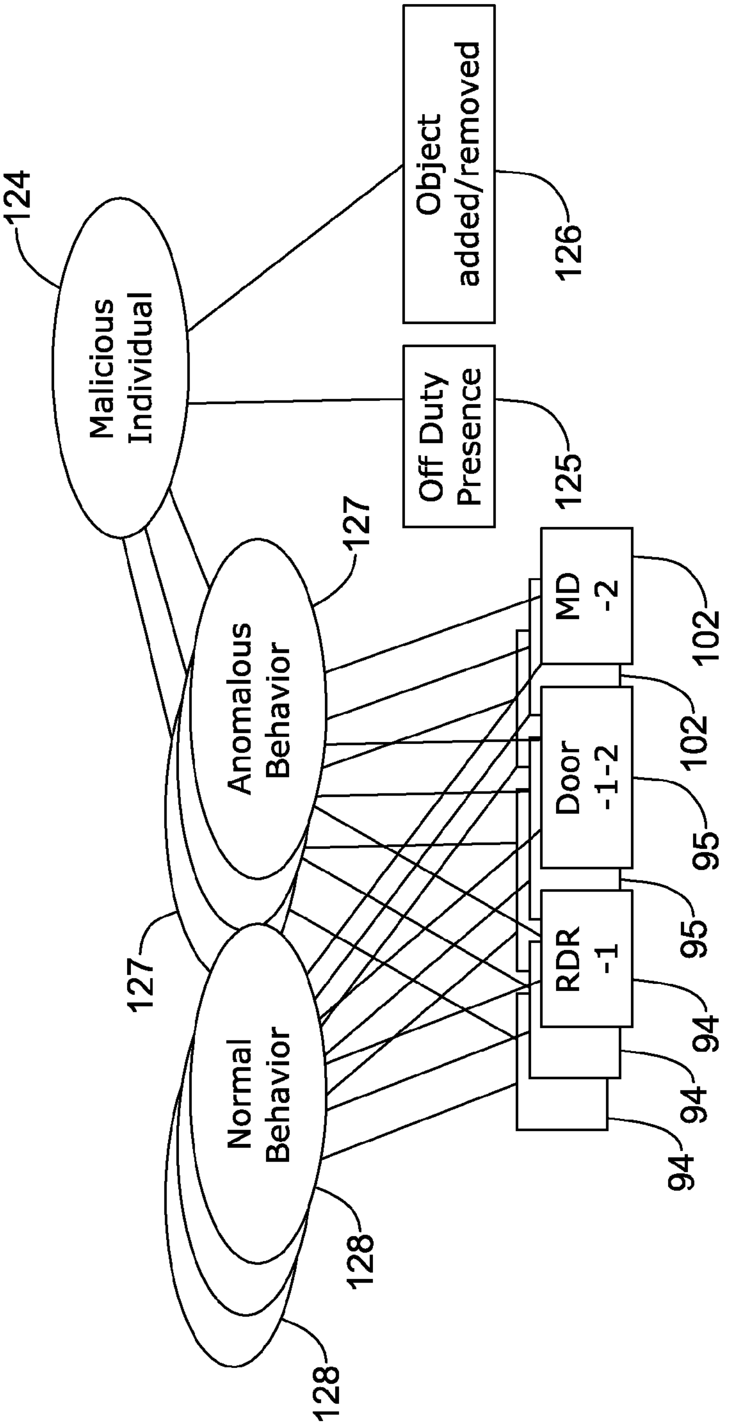
FIG. 23 shows multiple reports of an off duty presence and/or an object added/removed which may be correlated to a malicious hypothesis.

System aggregation may address this problem by correlating reports regarding an individual that may span longer time periods and other types of activities. If enough unusual behavior is observed within a particular time frame, then the hypothesis that the individual is engaged in malicious behavior may be deemed more likely. For example, as shown in FIG. 23 which shows multiple reports such as off duty presence 125 and/or an object added/removed 126 correlate to a malicious hypothesis 124, over a period of time, the individual may have exhibited possible anomalous behavior 127 a number of times. This might be correlated with the fact that at least one of the times the individual was supposed to be off-duty 125 and a video recorded that an object had been removed 126 from the room. Taken together, these reports lend credibility to the malicious individual hypothesis 124, rather than the normal behavior hypothesis 128.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A security system for protecting a physical installation, the security system comprising:

an access controller for controlling access to the physical installation comprising access control rules;

a plurality of physical sensors in communication with the controller, wherein the plurality of physical sensors sense physical threats to the physical installation;

a sensor report aggregator connected to the plurality of sensors and in communication with the access controller; and a security reference model connected to the sensor report aggregator, wherein the security reference model contains information about the protected physical installation including information about the protected physical installation's security goals;

wherein the sensor report aggregator outputs hypotheses descriptive of a threat situation based on combined reports from the plurality of sensors to the access controller.

2. The security system of claim 1, wherein a probability of the hypotheses being true is based on the reports from the plurality of sensors.

3. The security system of claim 2, wherein an alarm level is based on a certainty of the hypothesis and a severity of the threat situation described in the hypothesis.

4. The security system of claim 3, wherein the security reference model comprises:

a facility model;

a security model; and/or a plurality of attack models.

5. The security system of claim 4, further comprising a user interface connected to the sensor report aggregator.

6. The security system of claim 5, wherein the user interface comprises an alarm mechanism.

7. The security system of claim 5 wherein the user interface is a graphical interface.

8. The security system of claim 5, wherein the plurality of sensors comprises motion detectors, badge readers, door status indicators, biometric detectors, video cameras, trackers, radar, IR detectors, metal detectors, and/or object recognition devices.

9. The security system of claim 5, wherein:

the physical report aggregator is for clustering a number of reports into one or more sets of reports; and the number of reports is greater than a number of sets of reports.

10. A method for aggregating reports of physical activities related to physical threats to a protected physical installation, comprising:

providing an access controller in communication with a sensor report aggregator for controlling access to the physical installation, the access controller comprising access control rules;

providing a plurality of physical sensors in communication with the controller, wherein the plurality of physical sensors sense physical threats to the physical installation;

providing a security model containing information about the protected physical installation including information about the protected physical installation's security goals;

aggregating at the sensor report aggregator a number of reports of physical activities from the plurality of sensors; and proposing to the access controller a number of physical hypotheses describing a threat situation.

11. The method of claim 10, further comprising assigning a probability to at least one hypothesis.

12. The method of claim 11, wherein an alarm level of the at least one hypothesis is based on a certitude of the hypothesis and a severity of the threat situation described in the hypothesis.

13. The method of claim 12, wherein the security model is based on a facility model, a physical security model and/or a plurality of attack models.

14. The method of claim 10, wherein a hypothesis is developed by comparing the number of physical hypotheses with the security model.

15. A security system for protecting a physical installation comprising:

an access controller comprising access control rules;

a plurality of physical sensors comprising motion detectors, badge readers, door status indicators, biometric detectors, video cameras, trackers, radar, IR detectors, metal detectors, and/or object recognition devices in communication with the controller, wherein the sensors sense physical threats to the physical installation;

a sensor report aggregator connected to the plurality of sensors and in communication with the access controller; and a security reference model connected to the sensor report aggregator, wherein the security reference model contains information about the protected physical installation including information about the protected physical installation's security goals; and wherein the sensor report aggregator comprises a hypothesis developer that outputs hypotheses descriptive of a threat situation to the access controller.

16. The security system of claim 15, wherein the security reference model comprises:

a facility model;

physical attack models; and/or a physical security model.

17. The security system of claim 15, wherein the sensor report aggregator further comprises a hypothesis evaluator that evaluates the severity of the threat situation.

18. The security system of claim 17, further comprising a user interface connected to the sensor report aggregator.

* * * * *